United States Patent
Schilders

(10) Patent No.: US 12,229,191 B2
(45) Date of Patent: Feb. 18, 2025

(54) SYSTEMS AND METHODS FOR IN-SITU GRAPH-BASED DATA PROCESSING

(71) Applicant: Infosys Limited, Bangalore (IN)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 18/128,984

(22) Filed: Mar. 30, 2023

(65) Prior Publication Data

US 2024/0256606 A1  Aug. 1, 2024

Related U.S. Application Data

(63) Continuation of application No. 18/121,149, filed on Mar. 14, 2023.

(60) Provisional application No. 63/442,682, filed on Feb. 1, 2023.

(51) Int. Cl.
G06F 16/24 (2019.01)
G06F 16/25 (2019.01)
G06F 16/901 (2019.01)
G06T 11/20 (2006.01)

(52) U.S. Cl.
CPC ........ *G06F 16/9024* (2019.01); *G06F 16/252* (2019.01); *G06T 11/206* (2013.01); *G06T 2200/24* (2013.01); *G06T 2210/36* (2013.01)

(58) Field of Classification Search
CPC ..... G06F 16/9024; G06F 16/24; G06F 16/252
See application file for complete search history.

(56) References Cited

U.S. PATENT DOCUMENTS

| | | | | |
|---|---|---|---|---|
| 10,095,370 B2* | 10/2018 | Murasato | | H04L 41/12 |
| 11,048,483 B2* | 6/2021 | Dunn | | G06F 8/33 |
| 2007/0283352 A1* | 12/2007 | Degenhardt | | G06Q 10/06 718/100 |
| 2013/0117280 A1* | 5/2013 | Donaldson | | G06F 16/17 707/754 |

(Continued)

FOREIGN PATENT DOCUMENTS

WO   2018111699 A1   6/2018

OTHER PUBLICATIONS

Europe Patent Application No. 23165125.8, Extended European Search Report, dated Dec. 11, 2023.

(Continued)

*Primary Examiner* — Hosain T Alam
*Assistant Examiner* — Robert F May
(74) *Attorney, Agent, or Firm* — Finnegan, Henderson, Farabow, Garrett & Dunner LLP

(57) ABSTRACT

A system comprises an executable graph-based model. The executable graph-based model comprises a first overlay node. The first overlay node comprises processing logic that is operable to interact with one or more associated nodes of the executable graph-based model. Further, the executable graph-based model comprises a first node that has the first overlay node associated therewith. The system further comprises a processing unit configured to receive a first stimulus associated with the first overlay node and, in response to the first stimulus being received, cause execution of said processing logic of the first overlay node. Execution of said processing logic of the first overlay node is based on the first node.

20 Claims, 25 Drawing Sheets

(56) References Cited

U.S. PATENT DOCUMENTS

| | | | | |
|---|---|---|---|---|
| 2013/0311242 | A1* | 11/2013 | Duftler | G06Q 10/06 |
| | | | | 705/7.36 |
| 2014/0059518 | A1* | 2/2014 | Sierk | G06F 30/34 |
| | | | | 717/127 |
| 2014/0096108 | A1* | 4/2014 | Austin | G06Q 30/0283 |
| | | | | 717/113 |
| 2015/0169297 | A1* | 6/2015 | Kodosky | G06F 3/0481 |
| | | | | 717/105 |
| 2015/0277727 | A1* | 10/2015 | Jemiolo | G06F 40/197 |
| | | | | 715/704 |
| 2019/0258662 | A1* | 8/2019 | Bator | G06F 16/26 |
| 2020/0042887 | A1* | 2/2020 | Marcé | G06N 20/00 |
| 2021/0056077 | A1* | 2/2021 | Sapru | G06F 16/2365 |
| 2022/0360544 | A1* | 11/2022 | Mingels | G06F 16/9024 |
| 2023/0023655 | A1 | 1/2023 | Hui et al. | |

OTHER PUBLICATIONS

Bulatov: "Fitting larger networks into memory"; dated Jan. 14, 2018, URL:https://medium.com/tensorflow/fittinglarger-networks-into-memory-583e3c758ff9 [retrieved on Nov. 24, 2023].

* cited by examiner

PRIOR ART

SYSTEMS AND METHODS FOR IN-SITU GRAPH-BASED DATA PROCESSING

This application is a continuation of U.S. application Ser. No. 18/121,149 filed Mar. 14, 2023, which claims the benefit of U.S. Provisional Application No. 63/442,682 filed Feb. 1, 2023 which are hereby incorporated by reference in their entirety.

FIELD

The present disclosure relates to executable graph-based models. Particularly, but not exclusively, the present disclosure relates to executable graph-based models which integrate data and data processing functionality. Particularly, but not exclusively, the present disclosure relates to the dynamic generation of executable graph-based models at run-time.

BACKGROUND

Modern system designs typically separate data storage from any functional data structure used from a processing logic perspective. This separation often occurs when data is "at rest" or at run-time where the processing system interacts with a copy of the relevant data in the processing space that can be of a different representation. This separation also leads to an impedance mismatch which requires some form of a data management solution to perform the necessary mappings between the two states. As a result of this separate of concerns, the processing logic is typically performed in a separate technology and physical tier (in an n-tier architecture) from the data. This is illustrated in the example n-tier architecture shown in FIG. 1.

The example n-tier architecture 100 comprises a presentation layer 102, a processing logic layer 104, a data access layer 106, and a database layer 108. The presentation layer 102 comprises applications or components which are used to display the outputs of the processing logic layer 104 to a user or users. The processing logic layer 104 comprises applications, components, or services which perform some form of processing on the data obtained from the data access layer 106. The data access layer 106 comprises the applications, components, and/or services which can access the data used by the processing logic layer 104 and stored at the database layer 108. The database layer 108 handles the persistent storage of the data used by the system (e.g., in the form of a relational database, flat file, NoSQL database, graph database, and the like).

The layers of the example n-tier architecture 100 are technically separated. Each layer may utilize a separate set of components to perform specific functionality (e.g., a database management system is used in the database layer 108 whilst an enterprise application is used in the processing logic layer 104). The layers of the n-tier architecture 100 may also be physically separated. For example, the database layer 108 may execute on a remote cloud service, the processing logic layer 104 may execute on a network within an enterprise, and the presentation layer 102 may execute on a user device within the enterprise. While some architectural designs require a clear separation of concerns between data and the use of the data, often the separation enforced by architectures such as that illustrated in FIG. 1 can severely inhibit the flexibility, extensibility, and responsiveness of any system created.

Therefore, there is a need for enhanced architectures which provide improved flexibility, extensibility, and responsiveness thereby providing more efficient data processing systems.

SUMMARY OF DISCLOSURE

According to an embodiment of the present disclosure, there is provided a system comprising an executable graph-based model. The executable graph-based model comprises a first overlay node, wherein the first overlay node comprises processing logic operable to interact with one or more associated nodes of the executable graph-based model, and the executable graph-based model also comprises a first node having the first overlay node associated therewith. The system further comprises a processing unit configured to receive a first stimulus associated with the first overlay node and, in response to the first stimulus being received, cause execution of said processing logic of the first overlay node. Execution of said processing logic of the first overlay node is based on the first node.

According to another embodiment of the present disclosure, there is provided a system for dynamic generation of executable graph-based models. The system comprises processing circuitry and a memory unit operatively coupled to the processing circuitry and having instructions stored thereon that, when executed by the processing circuitry, cause the processing circuitry to obtain a graph-based model comprising one or more nodes; obtain a first overlay node comprising processing logic operable to interact with at least one node of an associated graph-based model; determine an association between a first node of the graph-based model and the first overlay node; and generate an executable graph-based model, wherein the executable graph-based model includes a first executable node comprising a composition of the first node of the graph-based model and the first overlay node based on the association between the first node of the graph-based model and the first overlay node.

According to another embodiment of the present disclosure, there is provided a method for storage management of executable graph-based models. The method comprises obtaining an executable graph-based model comprising a first executable node, wherein the first executable node comprises a composition of a first node and a first overlay. The method further comprises extracting the first node from the first executable node, the first node comprising a first node state and a first unique identifier, wherein the first node state shares the first unique identifier of the first node. The method further comprises extracting the first overlay from the first executable node, wherein the first overlay is a node comprising a second node state and a second unique identifier, wherein the second node state shares the second unique identifier of the first overlay. The method further comprises generating a plurality of manifests, wherein the plurality of manifests comprise a first node manifest associated with the first node, wherein the first node manifest shares the first unique identifier of the first node; a second node manifest associated with the first overlay, wherein the second node manifest shares the second unique identifier of the first overlay; and a first executable node manifest comprising the first unique identifier of the first node and the second unique identifier of the first overlay. The method further comprises generating a first package comprising a plurality of node manifest states, wherein each node manifest state of the plurality of node manifest states is associated with a corresponding node manifest of the plurality of node manifests. The method further comprises generating a second package comprising the first node state of the first node; and generating a third package comprising the second node state of the first overlay.

According to another embodiment of the present disclosure, there is provided a method for loading executable graph-based models. The method comprises obtaining a plurality of node manifest states, a plurality of node states, and one or more overlay node states. The method further comprises obtaining, based on a first unique identifier, a first node manifest state from the plurality of node manifest states, wherein the first node manifest state comprises the first unique identifier. The method further comprises obtaining, based on the first unique identifier, a first executable node manifest state from the plurality of node manifest states, wherein the first executable node manifest state comprises the first unique identifier and a second unique identifier. The method further comprises obtaining, based on the second unique identifier, a first overlay node manifest state from the plurality of node manifest states, wherein the first overlay node manifest state is associated with the second unique identifier. The method further comprises obtaining, based on the first unique identifier, a first node state from the plurality of node states, wherein the first node state is associated with the first unique identifier. The method further comprises obtaining, based on the second unique identifier, a second node state from the one or more overlay node states, wherein the second node state is associated with the second unique identifier. The method further comprises generating a plurality of manifests, wherein the plurality of manifests comprise: a first node manifest associated with the first node manifest state; a first overlay node manifest associated with the first overlay node manifest state; and a first executable node manifest associated with the first executable node manifest state. The method further comprises generating a first executable graph-based model based on the plurality of node manifests, the first node state, and the second node state.

According to an another embodiment of the present disclosure, there is provided a device comprising a display, an interface unit configured to receive one or more user inputs, and processing circuitry operatively coupled to the display and the interface unit. The processing circuitry is configured to obtain an executable graph-based model comprising an executable node, wherein the executable node comprises a composition of a first node and a first overlay structure associated with the first node. The processing circuitry is further configured to display, on the display of the device, a graphical representation of the executable node of the executable graph-based model, the graphical representation comprising a first display element associated with the first node and a second display element associated with the first overlay structure, wherein the second display element represents the first overlay structure at a first level of detail. The processing circuitry is further configured to display, on the display device, a first selector associated with the graphical representation of the executable node, and receive, from the interface unit, a first user input associated with the first selector. The processing circuitry is further configured to, in response to the first user input being received, replace the second display element of the graphical representation of the executable node with a third display element whilst maintaining display of the first display element, wherein the third display element represents the first overlay structure at a second level of detail.

BRIEF DESCRIPTION OF FIGURES

Embodiments of the present disclosure will now be described, by way of example only, and with reference to the accompanying drawings, in which.

DETAILED DESCRIPTION

Figure 1:
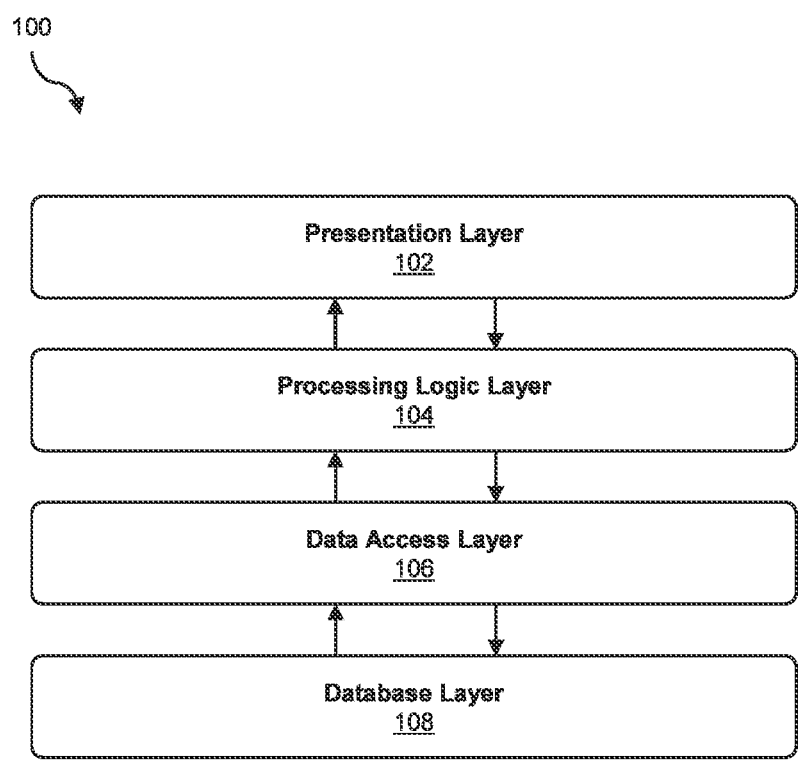
FIG. 1 shows a prior-art n-tier architecture.

Existing architectures, such as that described in relation to FIG. 1 above, maintain a forced technical, and sometimes physical, separation between the processing logic and the data. As previously stated, the technical and physical separation of data and processing logic can be inhibitive to the types of architectural systems that can be created. Furthermore, the complexity of n-tier architectures, and their strict separation of functionality (layers), can severely impact system real-time processing performance. This, in turn, leads to processing delays or latency which reduces the applicability of such architectures being used in time-critical application settings such as medical devices, autonomous vehicles, and real-time control systems. In addition, the central storage of all data within a single database or database layer (e.g., the database layer 108 show in FIG. 1) restricts the ways in which a user may access, maintain, and manage their personal data stored by an enterprise within the single database or database layer.

The present disclosure is directed to executable graph-based models which dynamically combine data and data processing functionality at run-time whilst their separability may be maintained when at rest. This is illustrated in FIG. 2.

Figure 2:
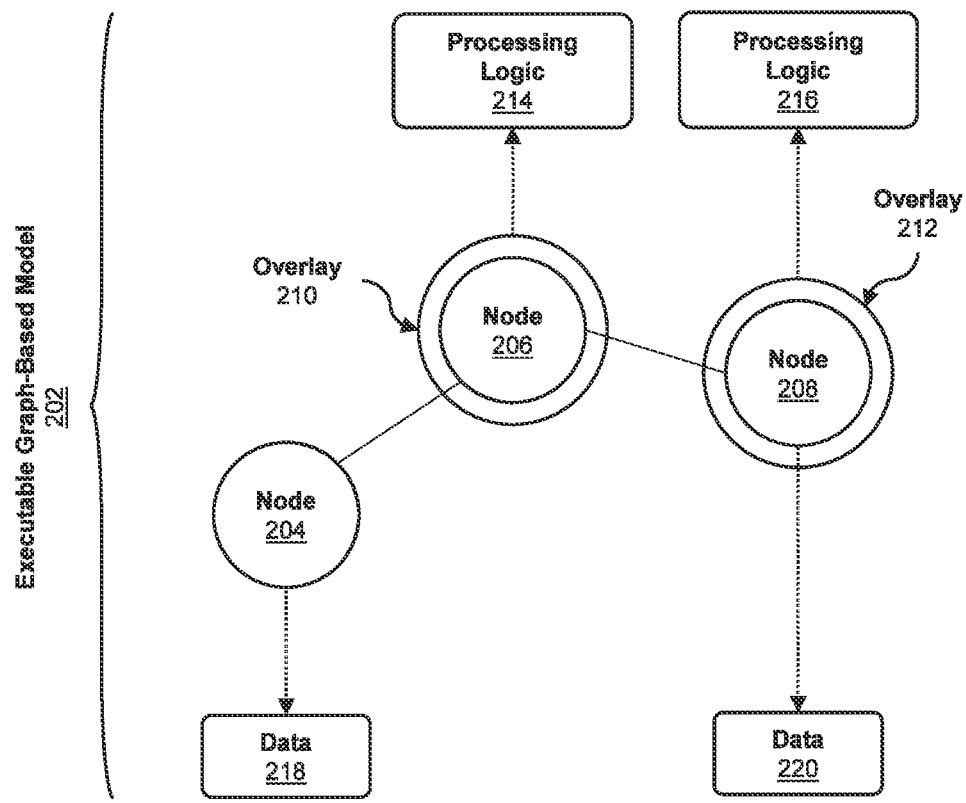
FIG. 2 shows an executable graph-based model, according to an embodiment of the present disclosure.

FIG. 2 illustrates an executable graph-based model 202 according to an embodiment of the present disclosure.

The executable graph-based model 202 is generally formed of a data structure (i.e., a graph-based model, or graphical model) comprising a plurality of nodes 204-208 which can be functionally extended with processing logic via the use overlays 210, 212. Each overlay comprises processing logic, such as processing logic 214 and 216 which are associated with overlays 210 and 212 respectively. At run-time, data such as data 218, 220 is associated with nodes within the executable graph-based model 202 and the overlays 210, 212 provide the functionality to respond to stimuli and interact with, manipulate, or otherwise process the data. As such, the structure and functionality of the data processing is separate from the data itself when offline (or at rest) and is combined dynamically at run-time.

As such, the executable graph-based model 202 maintains separability of the data and the data processing logic when offline thereby allowing the data to maintain control over their data. Moreover, by integrating the data and the data processing logic within a single model, processing delays or latency are reduced because the data and the processing logic exist within the same logical system. Therefore, the executable graph-based model 202 is applicable to a range of time-critical systems where efficient processing of stimuli is required.

Figure 3:
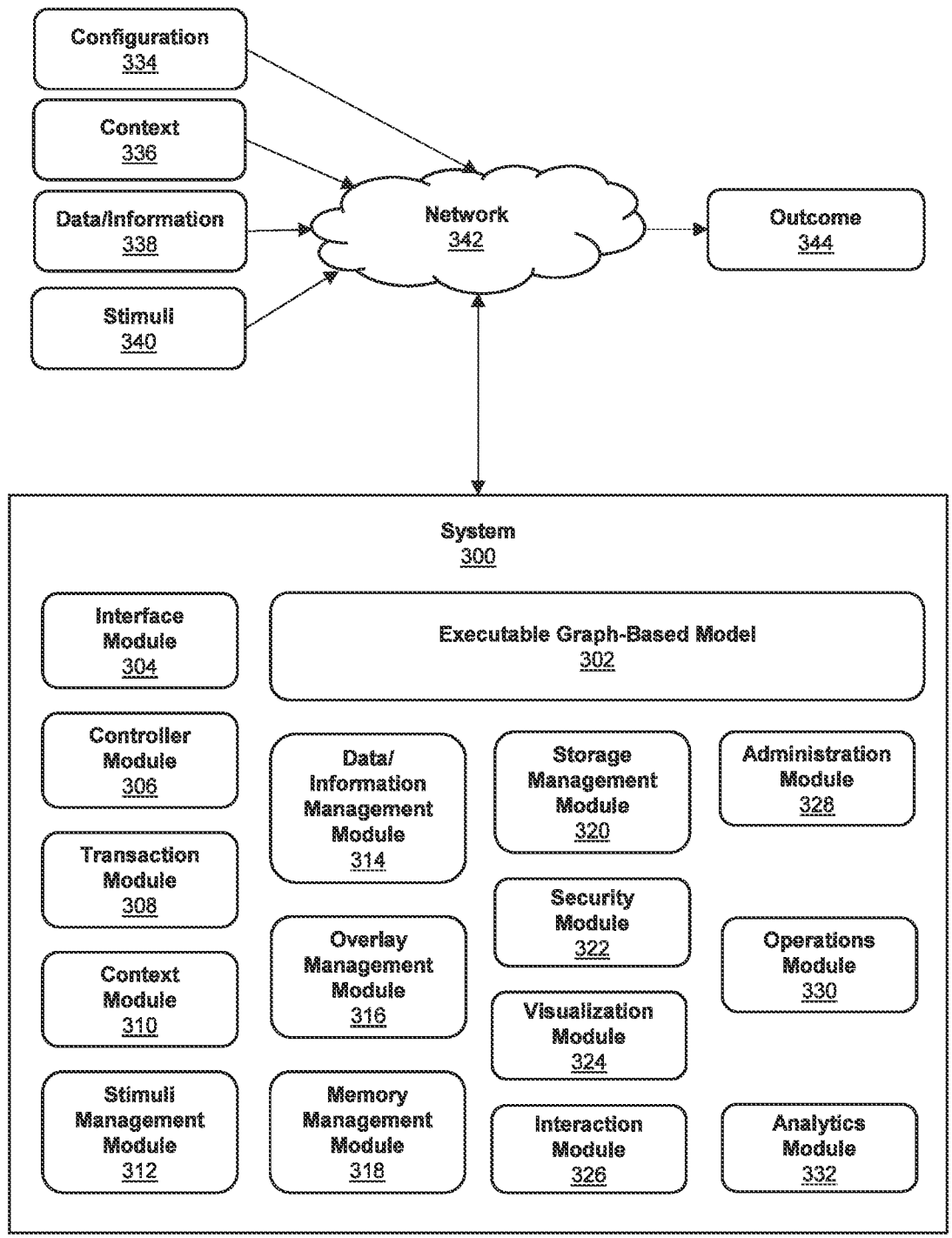
FIG. 3 shows a system for executable graph-based models, according to an embodiment of the present disclosure.

FIG. 3 shows a system 300 for execution, management, and configuration of executable graph-based models according to an embodiment of the present disclosure.

The system 300 comprises an executable graph-based model 302 as described in brief above in relation to FIG. 2. The system 300 further comprises an interface module 304, a controller module 306, a transaction module 308, a context module 310, a stimuli management module 312, a data management module 314, an overlay management module 316, a memory management module 318, a storage management module 320, a security module 322, a visualization module 324, an interaction module 326, an administration module 328, an operations module 330, and an analytics module 332. FIG. 3 further shows a configuration 334, a context 336, data 338, stimuli 340, a network 342, and an outcome 344.

The skilled person will appreciate that the present description of the system 300 is not intended to be limiting, and the system 300 can include, or interface with, further modules not expressly described herein. Moreover, the functionality of two or more of the modules can be combined within a single module. Conversely, the functionality of a single module can be split into two or more further modules which can be executed on two or more devices. The modules described below in relation to the system 300 can operate in a parallel, distributed, or networked fashion. The system 300 can be implemented in software, hardware, or a combination of both software and hardware. Examples of suitable hardware modules include, a general-purpose processor, a field programmable gate array (FPGA), and/or an application specific integrated circuit (ASIC). Software modules can be expressed in a variety of software languages such as C, C++, Java, Ruby, Visual Basic, Python, and/or other object-oriented, procedural, or other programming language.

The executable graph-based model 302 corresponds to application-specific combination of data and processing functionality which is manipulated, processed, and/or otherwise handled by the other modules within the system 300. As stated above, the structure and functionality of the data processing is separate from the data itself when offline (or at rest) and is combined dynamically at run-time. As such, different executable graph-based models are utilized for different application areas and problem domains. The skilled person will appreciate that whilst only one executable graph-based model 302 is shown in FIG. 3, in some embodiments a system stores and maintains more than one executable graph-based model.

Each element within the executable graph-based model 302 (both the data and the data processing functionality) is a node. As will be described in more detail in relation to FIG. 4A below, a node forms the fundamental building block of all executable graph-based models. As such, the executable graph-based model 302 comprises one or more nodes which can be dynamically generated, extended, or processed by one or more other modules within the system 300 (e.g., by the data management module 314 and/or the overlay management module 316).

The interface module 304 provides a common interface between internal components of the system 300 and/or external sources. The interface module 304 provides an application programmable interface ("API"), scripting interface, or any other suitable mechanism for interfacing externally or internally with any module of the system 300. In the example shown in FIG. 3, the configuration 334, the context 336, the data 338, and the stimuli 340 are received by the interface module 304 of the system 300 via the network 342. Similarly, outputs produced by the system 300, such as the outcome 344, are passed by the interface module 304 to the network 342 for consumption or processing by external systems. In one embodiment, the interface module 304 supports one or more messaging patterns or protocols such as the Simple Object Access protocol (SOAP), the REST protocol, and the like. The interface module 304 thus allows the system 300 to be deployed in any number of application areas, operational environments, or architecture deployments. Although not illustrated in FIG. 3, the interface module 304 is communicatively coupled (i.e., connected either directly or indirectly) to one or more other modules or elements within the system 300 such as the controller module 306, the context module 310, the executable graph-based model 302 and the like. In one embodiment, the interface module 304 is communicatively coupled (i.e., connected either directly or indirectly) to one or more overlays within the executable graph-based model 302.

The controller module 306 handles and processes interactions and executions within the system 300. As will be described in more detail below, stimuli (and their associated contexts) provide the basis for all interactions within the executable graph-based model 302. Processing of such stimuli may lead to execution of processing logic associated with one or more overlays within the executable graph-based model 302. The processing of a stimulus within the system 300 may be referred to as a system transaction. The processing and execution of stimuli (and associated overlay execution) within the system 300 is handled by the controller module 306. The controller module 306 manages all received input stimuli (e.g., the stimuli 340) and processes them based on a corresponding context (e.g., the context 336). The context associated with a stimulus determines the priority that is assigned to processing the stimulus by the controller module 306. This allows each stimulus to be configured with a level of importance and prioritization within the system 300.

The controller module 306 maintains the integrity of the modules within the system 300 before, during, and after a system transaction. The transaction module 308, which is associated with the controller module 306, is responsible for maintaining integrity of the system 300 through the lifecycle of a transaction. Maintaining system integrity via the controller module 306 and the transaction module 308 allows a transaction to be rolled back in the event of an expected or unexpected software or hardware fault or failure. The controller module 306 is configured to handle the processing of stimuli and transactions through architectures such as parallel processing, grid computing, priority queue techniques, and the like. In one embodiment, the controller module 306 and the transaction module 308 are communicatively coupled (i.e., connected either directly or indirectly) to one or more overlays within the executable graph-based model 302.

As stated briefly above, the system 300 utilizes a context-driven architecture whereby a stimulus within the system 300 is associated with a context which is used to adapt the handling or processing of the stimulus by the system 300. The context module 310 manages the handling of contexts within the system 300 and is responsible for processing any received contexts (e.g., the context 336) and translating the received context to an operation execution context. In some examples, the operation execution context is larger than the received context because the context module 310 supplements the received context with further information necessary for the processing of the received context. The context module 310 passes the operational execution context to one or more other modules within the system 300 to drive the execution of the stimulus associated with the operational execution context. Contexts within the system 300 can be external or internal. While some contexts apply to all application areas and problem spaces, some applications may require specific contexts to be generated and used to process received stimuli. As will be described in more detail below, the executable graph-based model 302 is configurable (e.g., via the configuration 334) so as only to execute within a given execution context for a given stimulus.

The stimuli management module 312 processes externally received stimuli (e.g., the stimuli 340) and any stimuli generated internally from any module within the system 300. The stimuli management module 312 is communicatively coupled (i.e., connected either directly or indirectly) to one or more overlays within the executable graph-based model 302 to facilitate processing of stimuli within the executable graph-based model 302. The system 300 utilizes different types of stimuli such as a command (e.g., a transactional request), a query, or an event received from an external system such as an Internet-of-Things (IoT) device. As previously stated, a stimulus can be either externally or internally generated. For example, a stimulus can be an event internally triggered (generated) from any of the modules within the system 300. Such internal stimuli indicate that something has happened within the system 300 such that subsequent handling by one or more other modules within the system 300 may be required. Internal stimuli can also be triggered (generated) from execution of processing logic associated with overlays within the executable graph-based model 302. The stimuli management module 312 communicates and receives stimuli in real-time or near-real-time. In some examples, stimuli are scheduled in a batch process. The stimuli management module 312 utilizes any suitable synchronous or asynchronous communication architectures or approaches in communicating the stimuli (along with associated information). All stimuli within the system 300 are received and processed (along with a corresponding context) by the stimuli management module 312, which then determines the processing steps to be performed. In one embodiment, the stimuli management module 312 processes the received stimuli in accordance with a predetermined configuration (e.g., the configuration 334) or dynamically determines what processing needs to be performed based on the contexts associated with the stimuli and/or based on the state of the executable graph-based model 302. In some examples, processing of a stimulus results in one or more outcomes being generated (e.g., the outcome 344). Such outcomes are either handled internally by one or more modules in the system 300 or communicated via the interface module 304 as an external outcome. In one embodiment, all stimuli and corresponding outcomes are recorded for auditing and post-processing purposes (e.g., by the operations module 330 and/or the analytics module 332).

The data management module 314 manages all data or information within the system 300 (e.g., the data 338) for a given application. Operations performed by the data management module 314 include data loading, data unloading, data modelling, and data processing. The data management module 314 is communicatively coupled (i.e., connected either directly or indirectly) to one or more other modules within the system 300 to complete some or all of these operations. For example, data storage is handled in conjunction with the storage management module 320 (as described in more detail below).

The overlay management module 316 manages all overlays within the system 300. Operations performed by the overlay management module 316 includes overlay and overlay structure modelling, overlay logic creation and execution, and overlay loading and unloading (within the executable graph-based model 302). The overlay management module 316 is communicatively coupled (i.e., connected either directly or indirectly) to one or more other modules within the system 300 to complete some or all of these operations. For example, overlays can be persisted in some form of physical storage using the storage management module 320 (as described in more detail below). As a further example, overlays can be compiled and preloaded into memory via the memory management module 318 for faster run-time execution. The design and functionality of overlays is discussed in greater detail in relation to FIG. 4A below.

The memory management module 318 is configured to manage and optimize the memory usage of the system 300. The memory management module 318 thus helps to improve the responsiveness and efficiency of the processing performed by one or more of the modules within the system 300 by optimizing the memory handling performed by these modules. The memory management module 318 uses direct memory or some form of distributed memory management architecture (e.g., a local or remote caching solution). Additionally, or alternatively, the memory management module 318 deploys multiple different types of memory management architectures and solutions. (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 334) independently to the requirements for one or more of modules of the system 300. For example, data priority and an eviction strategy, such as least-frequently-used ("LFU") or least-recently-used ("LRU"), can be configured for all or parts of the executable graph-based model 302. In one embodiment, the memory management module 318 is communicatively coupled (i.e., connected either directly or indirectly) to one or more overlays within the executable graph-based model 302.

The storage management module 320 manages the temporary or permanent storage of data within the system 300. The storage management module 320 is any suitable low-level storage device solution (such as a file system) or any suitable high-level storage technology such as another database technology (e.g., relational database management system (RDBMS) or NoSQL database). The storage management module 320 is directly connected to the storage device upon which the relevant data is persistently stored. For example, the storage management module 320 can directly address the computer readable medium (e.g., hard disk drive, external disk drive, or the like) upon which the data is being read or written. Alternatively, the storage management module 320 is connected to the storage device via a network such as the network 342 shown in FIG. 3. As will be described in more detail below in relation to FIGS. 12 and 13, the storage management module 320 uses "manifests" to manage the interactions between the storage device and the modules within the system 300. In one embodiment, the storage management module 320 is communicatively coupled (i.e., connected either directly or indirectly) to one or more overlays within the executable graph-based model 302.

The security module 322 manages the security of the system 300. This includes the security at a system level and at a module level. Security is hardware related, network related, or software related, depending on the operational environment, the architecture of the deployment, or the data and information contained within the system 300. For example, if the system is deployed with a web-accessible API (as described above in relation to the interface module 304), then the security module 322 can enforce a hypertext transfer protocol secure (HTTPS) protocol with the necessary certification. As a further example, if the data or information received or processed by the system 300 contains Personally Identifiable Information (PII) or Protected Health Information (PHI), then the security module 322 can implement one or more layers of data protection to ensure that the PII or PHI are correctly processed and stored. In an additional example, in implementations whereby the system 300 operates on United States of America citizen medical data, the security module 322 can enforce additional protections or policies as defined by the United States Health Insurance Portability and Accountability Act (HIPAA). Similarly, if the system 300 is deployed in the European Union (EU), the security module 322 can enforce additional protections or policies to ensure that the data processed and maintained by the system 300 complies with the General Data Protection Regulation ("GDPR"). In one embodiment, the security module 322 is communicatively coupled (i.e., connected either directly or indirectly) to one or more overlays within the executable graph-based model 302 thereby directly connecting security execution to the data/information in the executable graph-based model 302. The security module 322 thus acts as a centralized coordinator working in conjunction with the data management module 314 and overlay management module 316 for managing and executing security-based overlays.

The visualization module 324 and the interaction module 326 facilitate display and interaction of the executable graph-based model 302 and other parts of the system 300. As described in more detail below in relation to FIGS. 9A-9G, the visualization module 324 provides one or more displays, or visualizations, of the executable graph-based model 302 for review by a user of the system 300, whilst the interaction module 326 processes user interactions (e.g., inputs, commands, etc.) with the displays, or visualizations, and/or any other module within the system 300. The visualization module 324 and the interaction module 326 provide complex interactions capabilities such as standard two- and three-dimensional device interactions using a personal computer or mobile device and their attachable peripherals (e.g., keyboard, mouse, screen, etc.). Additionally, or alternatively, visualization module 324 and the interaction module 326 provide more advanced multi-dimensional user and visualization experiences such as virtual reality ("VR") or augmented reality ("AR") solutions. In one embodiment, the visualization module 324 and the interaction module 326 are communicatively coupled (i.e., connected either directly or indirectly) to one or more overlays within the executable graph-based model 302.

The administration module 328 manages all configurable aspects of the system 300 and the associated modules therein. Configuration is either directly embedded within the modules of the system 300 (for example, via hardware, bios, or other systems settings that are preset in the manufacturing process or software development and installation processes) or provided as dynamic configurations (e.g., via the configuration 334). Such dynamic configurations are controllable and changeable by an end-user with the appropriate administrative privileges. In one embodiment, the degree of administrative privileges associated with an end-user are contained within a received context (e.g., the context 336). Here, the end-user is a person connected to the administration module 328 via the interface module 304 or a system user directly connected to the administration module 328. In one embodiment, the administration module 328 provides read-only access to all configuration settings or allows some (or all) of the configuration settings to be changed by specific user groups defined in the administration module 328 (e.g., all users associated with a user group having sufficient access privileges). In embodiments where configurations are pre-set or predetermined, the administration module 328 provides capabilities to reset or return the system 300 to its initial state or "factory settings". In one embodiment, the administration module 328 is communicatively coupled (i.e., connected either directly or indirectly) to one or more overlays within the executable graph-based model 302.

The operations module 330 tracks operational metrics, module behavior, and the system 300. Operational metrics tracked by the operations module 330 include the running status of each module, the operating performance of transactions performed, and any other associated metrics to help determine the compliance of the entire system, or any module thereof, in relation to non-functional requirements. In one embodiment, the operations module 330 is communicatively coupled (i.e., connected either directly or indirectly) to one or more overlays within the executable graph-based model 302.

The analytics module 332 performs any analytical processing required by the modules within the system 300. The analytics module 332 processes any data embedded, or overlay contained, within the executable graph-based model 302 or created separately by the system 300 (e.g., the operation metrics produced by the operations module 330). As such, the analytics module 332 is communicatively coupled (i.e., connected either directly or indirectly) to one or more nodes and/or one or more overlays within the executable graph-based model 302.

Having now described the system 300 for executing and managing executable graph-based models, the description will now turn to the elements of an executable graph-based model; specifically, the concept of a node. Unlike conventional graph-based systems, all objects (e.g., data, overlays, etc.) within the executable graph-based model (e.g., the executable graph-based model 302) are implemented as nodes. As will become clear, this allows executable graph-based models to be flexible, extensible, and highly configurable.

Figure 4A:
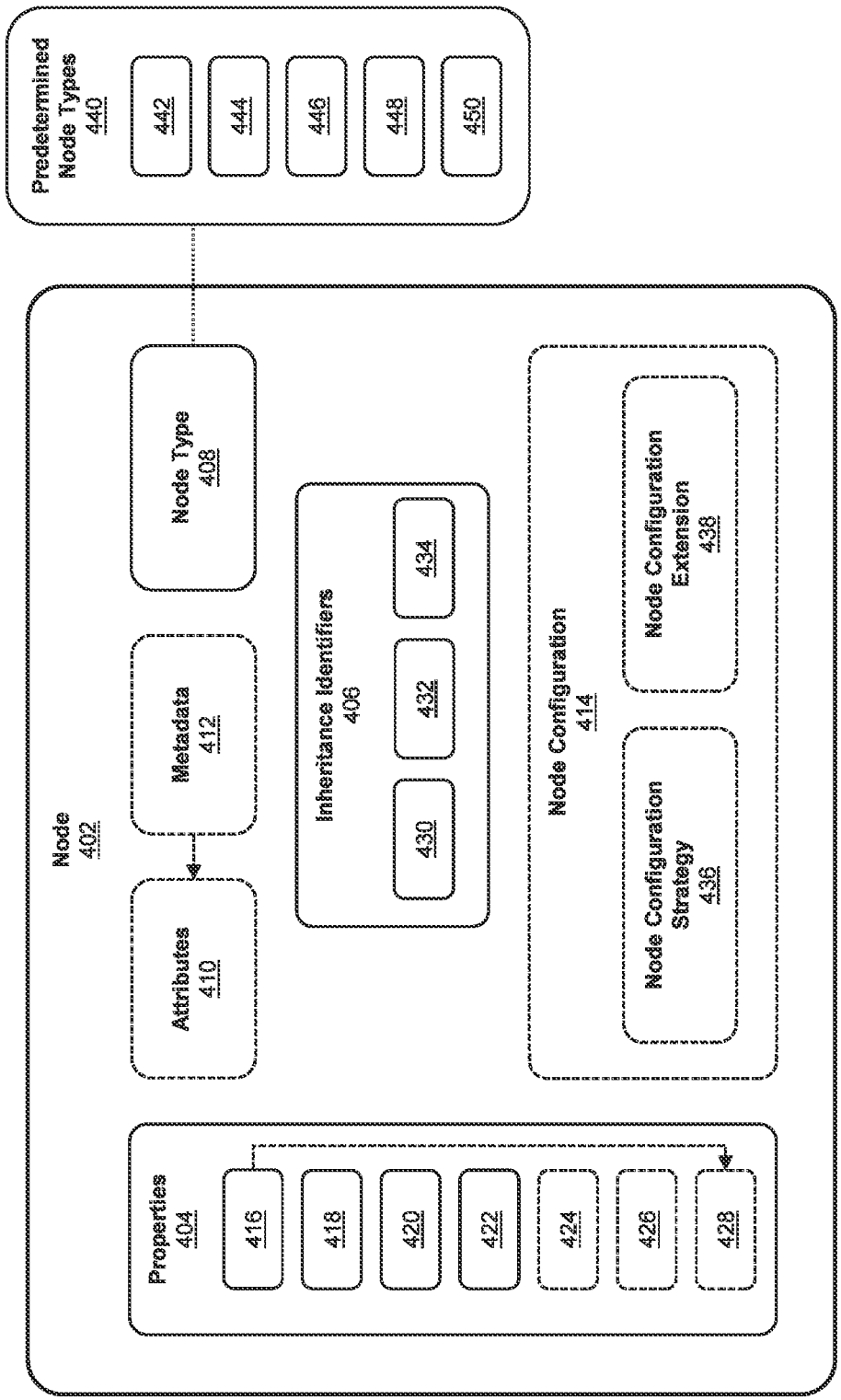
FIG. 4A shows the general structure of a node within an executable graph-based model, according to an embodiment of the present disclosure.

FIG. 4A shows the general structure of a node 402 within an executable graph-based model, such as the executable graph-based model 302 shown in FIG. 3, according to an embodiment of the present disclosure.

FIG. 4A shows a node 402 which corresponds to the core structure of an executable graph-based model (e.g., the executable graph-based model 302 shown in the system 300 of FIG. 3) and which forms the foundational building block for all data and data processing logic within the executable graph-based model. The node 402 comprises properties 404, inheritance identifiers 406, and node type 408. The node 402 optionally comprises one or more attributes 410, metadata 412, a node configuration 414. The properties 404 of the node 402 include a unique identifier 416, a version identifier 418, a namespace 420, and a name 422. The properties 404 optionally include one or more icons 424, one or more labels 426, and one or more alternative identifiers 428. The inheritance identifiers 406 of the node 402 comprise an abstract flag 430, a leaf flag 432, and a root flag 434. The node configuration 414 optionally comprises one or more node configuration strategies 436 and one or more node configuration extensions 438. FIG. 4A further shows a plurality of predetermined node types 440 which include a data node type 442, a value node type 444, an edge node type 446, a role node type 448, and an overlay node type 450.

The unique identifier 416 is unique for each node within an executable graph-based model. The unique identifier 416 is used to register, manage, and reference the node 402 within the system (e.g., the system 300 of FIG. 3). In some embodiments, the one or more alternative identifiers 428 are associated with the unique identifier 416 to help manage communications and connections with external systems (e.g., during configuration, sending stimuli, or receiving outcomes). The version identifier 418 of the node 402 is incremented when the node 402 undergoes transactional change. This allows the historical changes between versions of the node 402 to be tracked by modules or overlays within the system. The namespace 420 of the node 402, along with the name 422 of the node 402, is used to help organize nodes within the executable graph-based model. That is, the node 402 is assigned a unique name 422 within the namespace 420 such that the name 422 of the node 402 need not be unique within the entire executable graph-based model, only within the context of the namespace 420 to which the node 402 is assigned.

The node 402 optionally comprises one or more icons 424 which are used to provide a visual representation of the node 402 when visualized (e.g., by the visualization module 324 of the system 300 shown in FIG. 3). The one or more icons 424 can include icons at different resolutions and display contexts such that the visualization of the node is adapted to different display settings and contexts. The node 402 also optionally comprises one or more labels 426 which are used to override the name 422 when the node is rendered or visualized.

The node 402 supports the software development feature of multiple inheritance by maintaining references (not shown) to zero or more other nodes, which then act as the base of the node 402. This allows the behavior and functionality of a node to be extended or derived from one or more other nodes within an executable graph-based model. The inheritance identifiers 406 of the node 402 provide an indication of the inheritance-based information, which is applicable, or can be applicable, to the node 402. The inheritance identifiers 406 comprise a set of Boolean flags which identify the inheritance structure of the node 402. The abstract flag 430 of the inheritance identifiers 406 allows the node 402 to support the construct of abstraction. When the abstract flag 430 takes a value of "true", the node 402 is flagged as abstract meaning that it cannot be instantiated or created within an executable graph-based model. Thus, a node having the abstract flag 430 set to "true" can only form the foundation of another node that inherits from it. By default, the abstract flag 430 of a node is set to "false". The leaf flag 432 of the inheritance identifiers 406 is used to indicate whether any other node can inherit from the node 402. If the leaf flag 432 is set to "true", then no other node can inherit from the node 402 (but unlike an abstract node, a node with a leaf flag set can still be instantiated and created within an executable graph-based model). The root flag 434 of the inheritance identifiers 406 is used to indicate whether the node 402 inherits from any other node. If the root flag 434 is set to "true", then the node 402 does not inherit from any other node. The node 402 is flagged as leaf (i.e., the leaf flag 432 is set to "true") and/or root (i.e., the root flag 434 is set to "true"), or neither (i.e., both the leaf flag 432 and the root flag 434 are set to "false"). The skilled person will appreciate that a node cannot be flagged as both abstract and leaf (i.e., the abstract flag 430 cannot be set to "true" whilst the leaf flag 432 is set to "true").

As stated above, all elements of the executable graph-based model are defined as nodes. This functionality is in part realized due to the use of a node type. The node type 408 of the node 402 is used to extend the functionality of the node 402. All nodes within an executable graph-based model comprise a node type which defines additional data structures and implements additional executable functionality. A node type thus comprises data structures and functionality that is common across all nodes which share that node type. The composition of a node with a node type therefore improves extensibility by allowing the generation of specialized node functionalities for specific application areas. Such extensibility is not present in prior art graph-based models. As illustrated in FIG. 4A, the node 402 and the node type 408 are one logical unit which are not separated in the context of an executing system at run-time (i.e., in the context of execution of an executable graph-based model).

FIG. 4A shows the plurality of predetermined node types 440 which provides a non-exhaustive list of node types which can be associated with a node, such as the node 402.

The data node type 442 (also referred to as a vertex or vertex node type) comprises common data structure and functionality related to the "things" modelled in the graph—i.e., the data.

The value node type 444 comprises common data structures and functionality related to a shared attribute stored at the associated node. Whilst shared attributes are discussed in more detail below, a node having the value node type 444 comprises an attribute value (i.e., the attribute state) which is shared between nodes within the executable graph-based model.

The edge node type 446 comprises common data structures and functionality related to joining two or more nodes.

A node having the edge node type 446 can connect two or more nodes and thus the edge node type 446 constructs associations and connections between nodes (for example objects or "things") within the executable graph-based model. The edge node type 446 is not restricted to the number of nodes that can be associated or connected by a node having the edge node type 446. The data structures and functionality of the edge node type 446 thus define a hyper-edge which allows two or more nodes to be connected through a defined set of roles. As will be described in more detail below, a role which defines a connective relationship involving an edge is either a (standard) role, as is known within standard hyper-graph theory such that the role merely defines a connection between the edge and another node, or the role is a node having the role node type 448. These concepts are illustrated in FIGS. 5 and 5B described below.

Figure 5:
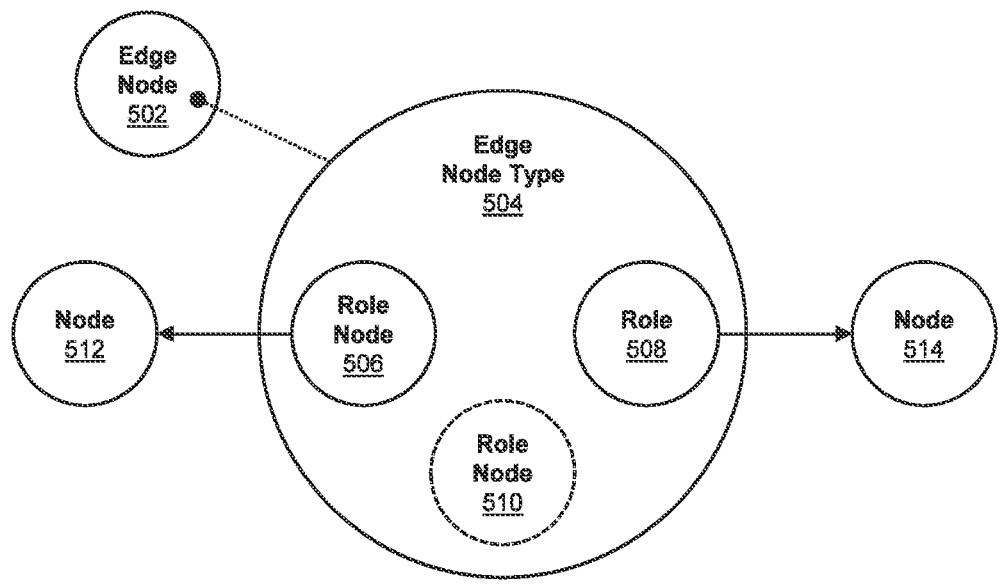
FIG. 5 illustrates the concept of a hyper-edge, according to an embodiment of the present disclosure.

FIG. 5 illustrates the concept of a hyper-edge connecting two or more nodes through a defined set of roles, according to an embodiment of the present disclosure.

FIG. 5 shows a simplified representation of an edge node 502 which comprises an edge node type 504 (within the context of the example shown in FIG. 4A, the edge node 502 corresponds to the node 402 where the node type 408 is the edge node type 446). The edge node type 504 comprises a plurality of roles which each define a connective relationship involving the edge node 502, e.g., a connective relationship between the edge node 502 and another node. The plurality of roles of the edge node type 504 comprises a first role node 506 and a role 508. The plurality of roles optionally comprises a further role in the form of a second role node 510. The first role node 506 is a node having a role node type (i.e., the role node type 448 shown in FIG. 4A) and defines a connective relationship between the edge node 502 and a first node 512. The role 508 defines a connective relationship between the edge node 502 and a second node 514. The second role node 510 is a node having the role node type and defines a relationship without expressly defining the node to which the edge connects. Whilst the example in FIG. 5 shows the edge node type 504 having two, or even three, roles, the number of roles (and thus the number of connections) that an edge node type can have is not so limited.

As stated above, a role defines a connective relationship involving the edge node 502 (via the edge node type 504) and can be either a (standard) role, such as the role 508, or a role node, such as the first role node 506 or the second role node 510. The standard role simply defines a connective relationship between an edge node and another node. Thus, in the example shown in FIG. 5, the role 508 defines the connection between the edge node 502 and the second node 514 (via the edge node type 504). A role node is a node having a role node type (i.e., the role node type 448 shown in FIG. 4A) and, like the (standard) role, defines a connective relationship involving an edge. However, because a role node is a node, a role node gains the capabilities, functionality, and extensibility of a node (as described in relation to FIG. 4A). A role node thus describes a potentially more complex connective relationship than a (standard) role. In the example shown in FIG. 5, the first role node 506 defines a connective relationship between the edge node 502 and the first node 512 (via the edge node type 504). Beneficially, by utilizing the first role node 506 to define the connective relationship between the edge node 502 and the first node 512 the capabilities afforded to a node are provided to the first role node 506. For example, and as will be described in more detail below, one or more overlay nodes can be associated with a role node to imbue the role node with processing logic thus allowing the role node to process data, respond to stimuli, etc. Moreover, a role node need not define a connective relationship to a node, as illustrated by the second role node 510. Because the second role node 510 is itself a node, the second role node 510 encompasses the data structures and functionality of a node thereby avoiding the need to define the connecting node directly.

Referring once again to FIG. 4A, the plurality of predetermined node types 440 further comprise the overlay node type 450. As will be described in more detail below, the overlay node type 450 is used to extend the functionality of a node, such as the node 402, to incorporate processing logic.

The one or more attributes 410 correspond to the data associated with the node 402 (e.g., the data represented by the node 402 within the executable graph-based model as handled by a data management module such as the data management module 314 of the system 300 shown in FIG. 3). Because not all nodes within an executable graph-based model is associated with data, a node need not have any attributes. Each of the one or more attributes 410 are stored in any suitable format such as a data triplet of name, value type, and value. The one or more attributes 410 represent a complex data type—each attribute of the one or more attributes 410 is composed of an attribute behavior, as shown in FIG. 6.

Figure 6:
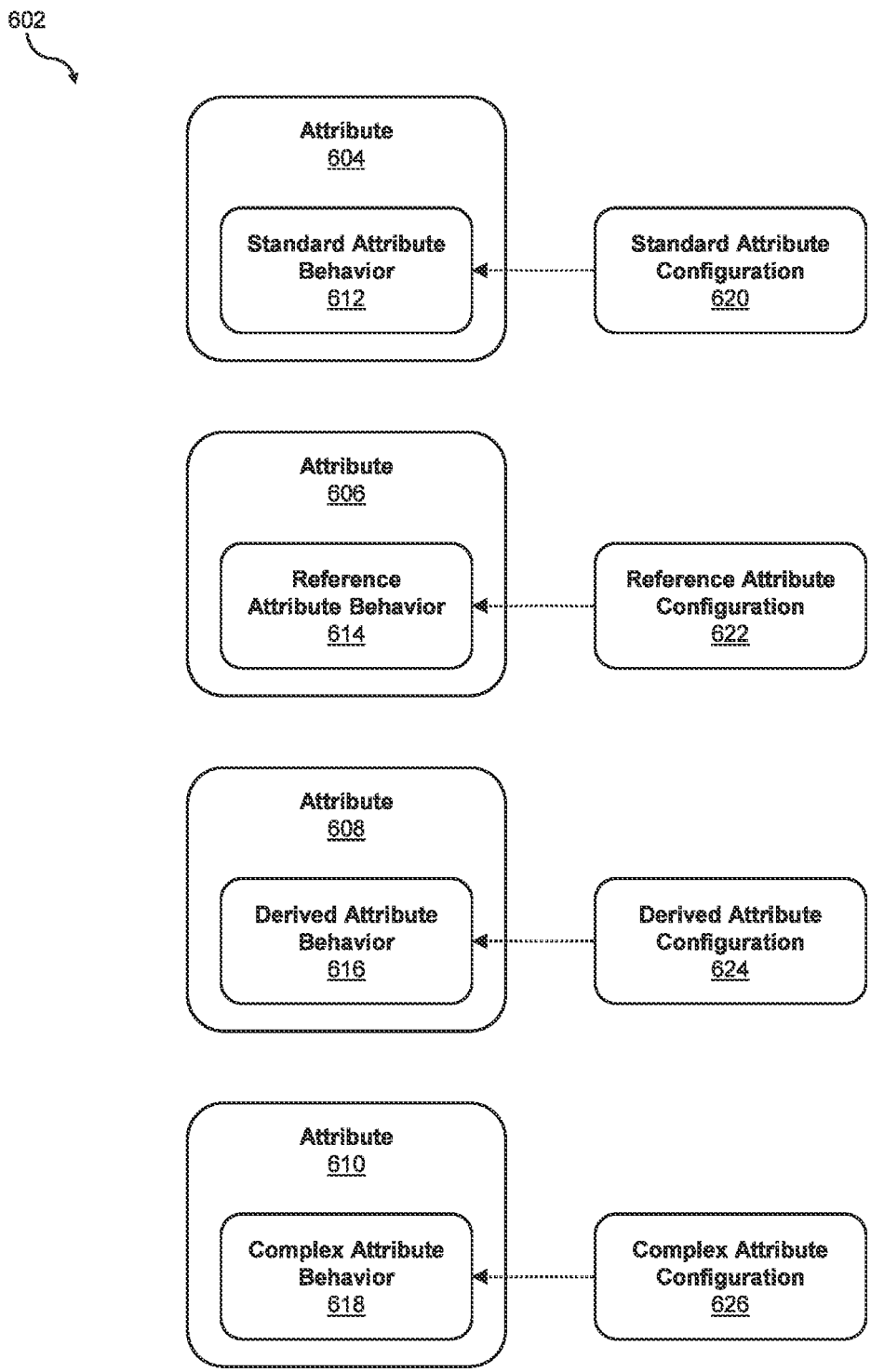
FIG. 6 illustrates attribute behaviors according to embodiments of the present disclosure.

FIG. 6 illustrates attribute behaviors according to embodiments of the present disclosure.

FIG. 6 shows a plurality of attributes 602 including a first attribute 604, a second attribute 606, a third attribute 608, and a fourth attribute 610. In an embodiment, one or more of the plurality of attributes correspond to the one or more attributes 410 of the node 402 shown in FIG. 4A. Each of the plurality of attributes shown in FIG. 6 is composed of an attribute behavior which defines the behavior of the corresponding attribute. The first attribute 604 is composed of a standard attribute behavior 612, the second attribute 606 is composed of a reference attribute behavior 614, the third attribute 608 is composed of a derived attribute behavior 616, and the fourth attribute 610 is composed of a complex attribute behavior 618. The attribute behaviors of the plurality of attributes are configured by associated attribute configurations. These attribute configurations are all examples of attribute configuration extensions which are node configuration extension (i.e., they are part of the one or more node configuration extensions 438 of the node 402 shown in FIG. 4A). The standard attribute behavior 612 is configured by a standard attribute configuration 620, the reference attribute behavior 614 is configured by a reference attribute configuration 622, the derived attribute behavior 616 is configured by a derived attribute configuration 624, and the complex attribute behavior is configured by a complex attribute configuration 626.

As stated in more detail below, an attribute behavior defines the behavior of the corresponding attribute. The standard attribute behavior 612, associated with the first attribute 604, is a behavior which allows read-write access to the data of the first attribute 604. The reference attribute behavior 614, associated with the second attribute 606, is a behavior which allows read-write access to the data of the second attribute 606 but restricts possible values of the data to values defined by a reference data set. The reference attribute configuration 622 (which is used to configure the reference attribute behavior 614) includes the appropriate information to obtain the reference data set of possible values. The derived attribute behavior 616, associated with the third attribute 608, is a behavior which allows read-only access to the data of the third attribute 608. The data of the third attribute 608 is derived from other data, or information, within the executable graph-based model in which the node of the third attribute 608 is used. The data is derived from one or more other attributes associated with the node or is derived from more complex expressions depending on the application area. In one embodiment, the derived attribute configuration 624 (which is used to configure the derived attribute behavior 616) includes mathematical and/or other forms of expressions (e.g., regular expressions, templates, and the like) that are used to derive the data (value) of the third attribute 608. The complex attribute behavior 618, associated with the fourth attribute 610, is a behavior which allows the fourth attribute 610 to act as either a standard attribute behavior 612 if the data of the fourth attribute 610 is directly set, or a derived attribute behavior 616 if the data of the fourth attribute 610 is not directly set.

Referring once again to FIG. 4A, the node 402 optionally comprises metadata 412 (e.g., data stored as a name, value type, and value triplet) which is associated with either the node 402 or one or more of the one or more attributes 410 of the node 402.

An attribute within the one or more attributes 410 may either have independent or shared state. An independent attribute has data which is not shared with any other node within the executable graph-based model. Conversely, a shared attribute has data which is shared with one or more other nodes within the executable graph-based model. For example, if two nodes within an executable graph-based model both comprise a shared-data attribute with a value state shared by both nodes, then updating the data (e.g., the value) of this shared attribute will be reflected across both nodes.

The node configuration 414 provides a high degree of configurability for the different elements of a node. The node configuration 414 optionally comprises one or more node configuration strategies 436 and/or one or more node configuration extensions 438 which are complex data types (as described above in more detail below in relation to FIG. 6). An example of a concrete node configuration strategy is an identifier strategy, associated with the configuration of the unique identifier 416 of the node 402, which creates Snowflake identifiers. A further example of a concrete node configuration strategy is a versioning strategy, associated with the configuration of the version identifier 418 of the node 402, which supports major and minor versioning (depending on the type of transactional change incurred by the node 402).

According to an embodiment of the present disclosure, the structure and functionality of the node 402 (as described above) can be dynamically extended using the concept of an executable node. As described in relation to FIG. 4B below, an executable node provides processing functionality (i.e., processing logic) for a base node via one or more associated overlay nodes.

Figure 4B:
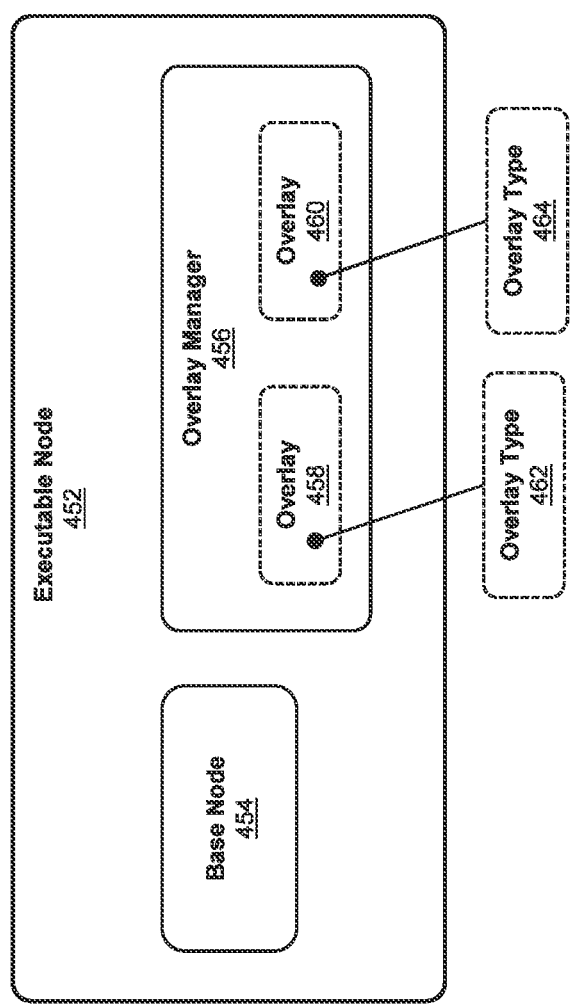
FIG. 4B shows an executable node, according to an embodiment of the present disclosure.

FIG. 4B shows an executable node 452, according to an embodiment of the present disclosure.

The executable node 452 comprises a base node 454 and an overlay manager 456. The overlay manager 456 registers and maintains one or more overlay nodes associated with the base node 454, such as the first overlay node 458 and the second overlay node 460. The first overlay node 458 has a first overlay node type 462 and the second overlay node 460 has a second overlay node type 464.

The executable node 452 is itself a node; that is, the executable node 452 extends the node 402 (or is a subtype of the node 402) such that all the functionality and properties of the node 402 extend to the executable node 452. The executable node 452 also dynamically extends the functionality of the base node 454 by associating the overlays maintained by the overlay manager 456 with the base node 454. The executable node may thus be considered a composition of a base node and an overlay node and may alternatively be referred to as a node with overlay. For example, the base node 454 may have a data node type associated with a user, and the overlay manager 456 may comprise an encryption overlay which has processing logic that encrypts the attribute values of the base node 454 prior to the values being saved or output from the system. Therefore, the executable node 452 acts as a decorator of the base node 454 adding the functionality of the overlay manager 456 to the base node 454.

The skilled person will appreciate that the base node 454 refers to any suitable node within an executable graph-based model. As such, the base node 454 can be a node having a type such as a data node type, a value node type, or the like. Alternatively, the base node 454 can itself be an executable node such that the functionality of the base (executable) node 454 is dynamically extended. In this way, complex and powerful processing functionality can be dynamically generated by associating and extending overlay nodes.

The overlay manager 456 registers and maintains one or more overlay nodes associated with the base node 454, such as the first overlay node 458 and the second overlay node 460. The assignment of an overlay node to a base node (via the overlay manager 456) endows the base node with processing logic and executable functionality defined within the overlay node. Extending the functionality of a base node through one or more overlay nodes is at the heart of the dynamic generation of executable graph-based models according to an embodiment of the present disclosure. As illustrated in FIG. 2 above, the data (e.g., a data node as represented by the base node 454 in FIG. 4B) and the functionality which acts upon that data (e.g., an overlay node) can be separated and independently maintained offline, but at run-time, an association between the data node and the overlay node is determined and an executable node is generated (e.g., the executable node 452 shown in FIG. 4B).

An overlay node, such as the first overlay node 458 or the second overlay node 460, is a node having an overlay node type (alternatively referred to as an overlay type) assigned to its node type. As shown in FIG. 4B, the first overlay node 458 has the first overlay node type 462 and the second overlay node 460 has the second overlay node type 464. Different overlay node types are used to realize different functionality. Example overlay node types include an encryption overlay node type, an obfuscation overlay node type, an audit overlay node type, a prediction overlay node type, and the like. For example, if the first overlay node type 462 is an obfuscation node type and the second overlay node type 464 is an encryption node type then the functionality of the base node 454 is extended to provide obfuscation and encryption of attribute values of the base node 454. The skilled person will appreciate that the list of overlay types is in no way exhaustive and the number of different overlay types that can be realized is not limited. Because an overlay node is itself a node, all functionality of a node described in relation to the node 402 of FIG. 4A is thus applicable to an overlay node. For example, an overlay node comprises a unique identifier, a name, etc., can have attributes (i.e., an overlay node can have its own data defined), supports multiple inheritance, and can be configured via node configurations. Furthermore, because an overlay node is a node, the overlay node can have one or more overlay nodes associated therewith (i.e., the overlay node is an overlay with overlay node). Moreover, the processing functionality of an overlay node extends to the node type of the node to which the overlay node is applied.

An overlay node, such as the first overlay node 458 or the second overlay node 460, is not bound to a single executable node or a single executable graph-based model (unlike nodes which have non-overlay node types). This allows overlay nodes to be centrally managed and reused across multiple instances of executable graph-based models.

Unlike non-overlay nodes, an overlay node comprises processing logic (not shown in FIG. 4B) which determines the functionality of the overlay node. The processing logic of an overlay node comprises a block of executable code, or instructions, which carries out one or more operations. The block of executable code is pre-compiled code, code which requires interpretation at run-time, or a combination of both. Different overlay nodes provide different processing logic to realize different functionality. For example, an encryption overlay node comprises processing logic to encrypt the data (i.e., attributes) of a data node associated with the encryption overlay node, whilst an auditing overlay node comprises processing logic to record changes to the nodes state of a node associated with the auditing overlay node.

The overlay manager 456 of the executable node 452 is responsible for executing all overlays registered with the overlay manager 456. The overlay manager 456 also coordinates execution all associated overlay nodes. In the example shown in FIG. 4B, the executable node 452 associates the base node 454 with two overlay nodes—the first overlay node 458 and the second overlay node 460. Thus, the overlay manager 456 employs a strategy to manage the potentially cascading execution flow. Example strategies to manage the cascading execution of overlays include the visitor pattern and the pipe and filter pattern. Further examples include strategies which apply either depth-first or depth-first processing patterns, a prioritization strategy, or a combination therefor. All execution strategies are defined and registered with the overlay manager 456 and are associated with an overlay via a node configuration extension for the overlay.

Figure 4C:
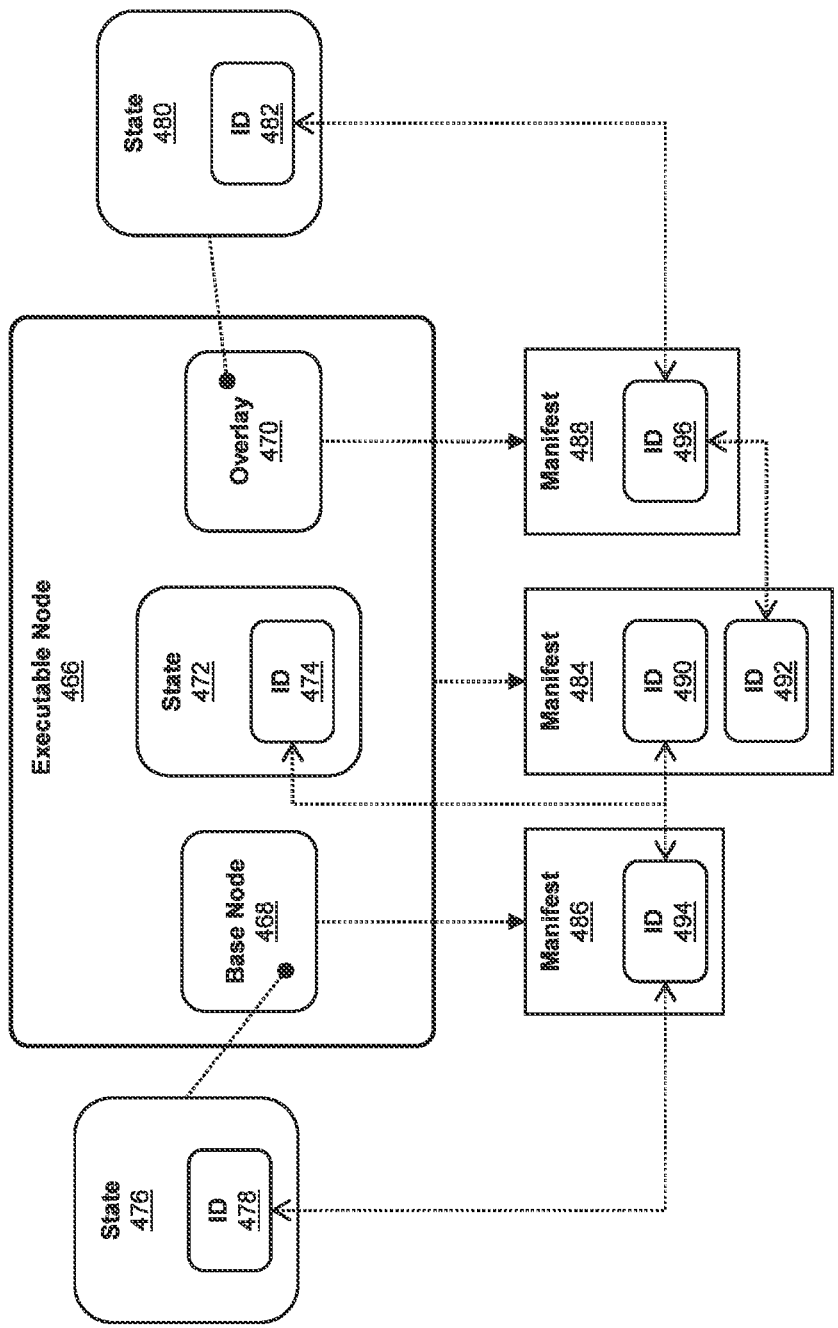
FIG. 4C shows the decomposition of an executable node for storage, according to an embodiment of the present disclosure.

Before describing an example executable graph-based model, the description will turn to the decomposition of an executable node for persistent storage, as shown in FIG. 4C.

FIG. 4C illustrates the decomposition of an executable node 466 for storage, according to an embodiment of the present disclosure.

The executable node 466 (e.g., the executable node 452 shown in FIG. 4B) comprises a composition of a base node 468 and an overlay node 470. The executable node 466 comprises a state 472 with an identifier 474, the base node 468 comprises a state 476 with an identifier 478, and the overlay node 470 comprises a state 480 with an identifier 482. A manifest 484-488 is generated for each of the executable node 466, the base node 468, and the overlay node 470. The manifest 484 associated with the executable node 466 comprises an identifier 490 and an overlay identifier 492. The manifest 486 associated with the base node 468 comprises an identifier 494 and the manifest 488 associated with the overlay node 470 comprises an identifier 496.

The state 472 of the executable node 466 comprises all data required to reconstruct the executable node 466 (e.g., attributes, properties, etc.). The state 472 of the executable node 466 is persistently stored along with the identifier 474. The manifest 484 is generated for the executable node 466 and comprises the identifier 490 (which is the same as the identifier 474), the storage location of the state 472 of the executable node 466, and the overlay identifier 492 (which is the same as the identifier 496). The overlay identifier 492 thus identifies the manifest 488 associated with the overlay node 470. A manifest state (not shown) is then generated for the manifest 484 and persistently stored along with the identifier 490.

The state 476 of the base node 468 comprises all data required to reconstruct the base node 468 (e.g., attributes, properties, etc.) and is persistently stored along with the identifier 478. The manifest 486 is generated for the base node 468 and comprises the identifier 494 and the storage location of the state 476 of the base node 468. The identifier 478 of the state 476 and the identifier 494 of the manifest 486 is the same as the identifier 474 of the state 472 of the executable node 466 (which is also the same as the identifier 490 of the manifest 484 of the executable node 466). A manifest state (not shown) is then generated for the manifest 486 and persistently stored along with the identifier 494. Thus, the states, manifests, and manifest states for the executable node 466 and the base node 468 all comprise the same, shared, identifier. A shared identifier can be used in this instance because the states, manifests, and manifest states are stored separately.

The state 480 of the overlay node 470 comprises all data required to reconstruct the overlay node 470 (e.g., attributes, properties, processing logic, etc.) and is persistently stored along with the identifier 482. The manifest 488 is generated for the overlay node 470 and comprises the identifier 496, which is the same as the identifier 482. A manifest state (not shown) is then generated for the manifest 488 and is persistently stored along with the identifier 496.

As will be described in more detail in relation to FIGS. 12 and 13 below, an executable graph-based model may be stored (and loaded) using the above described decomposition. Beneficially, each component is stored separately thereby allowing a user to maintain and store their data independently of the storage of the structure and functionality of the executable graph-based model.

Having described the structure and function of the node 402 (FIG. 4A) and the executable node 452 (FIG. 4B), which form the foundation of an executable graph-based model, an example executable graph-based model will now be described to provide further understanding of the aspects/embodiments described above.

Figure 7A:
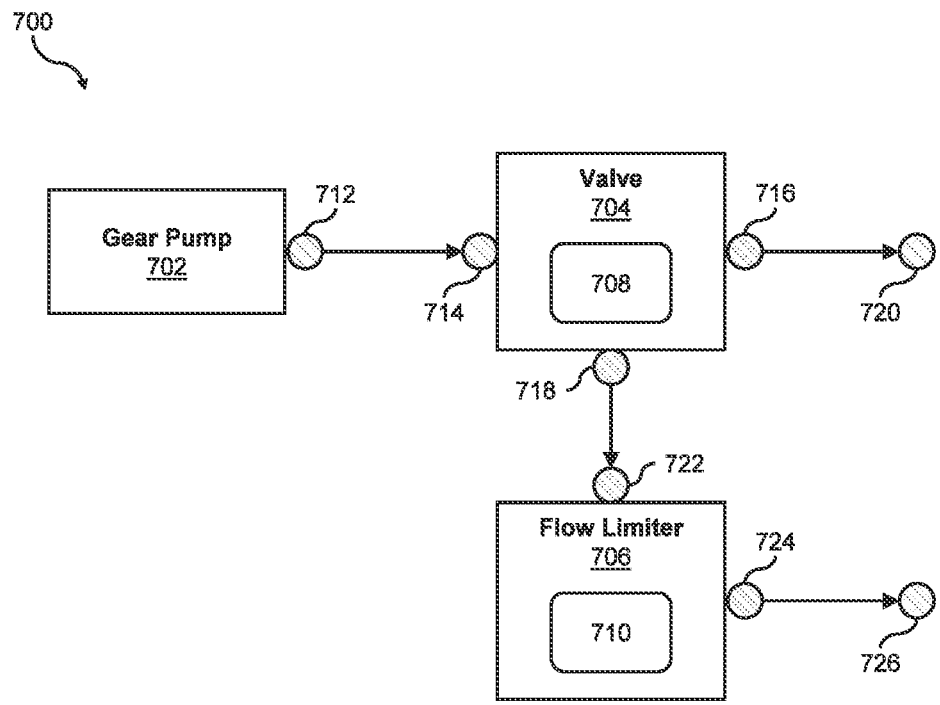
FIGS. 7A-7C illustrate an example executable graph-based model, according to an embodiment of the present disclosure.

FIG. 7A illustrates a system 700 to be modelled by an executable graph-based model, according to an embodiment of the present disclosure.

The system 700 comprises a gear pump 702, a vale 704, and a flow limiter 706. The valve 704 comprises a sensor 708 configured to obtain one or more pressure measurements from the valve 704. The flow limiter 706 comprises a sensor 710 configured to obtain one or more pressure measurements from the flow limiter 706. The gear pump 702 comprises an outlet 712 which is in fluid communication with an inlet 714 of the valve 704. The valve 704 comprises a first outlet 716 and a second outlet 718. The first outlet 716 of the valve 704 is in fluid communication with a waste outlet 720 of the system 700. The second outlet 718 of the valve 704 is in fluid communication with an inlet 722 of the flow limiter 706. An outlet 724 of the flow limiter 706 is in fluid communication with an outlet 726 of the system 700.

The system 700 shown in FIG. 7A is a simplified industrial system whereby a fluid (e.g., a gas or a liquid) is pumped via the gear pump 702 to the valve 704. During normal operation, the valve 704 is set such that the fluid flows through the flow limiter 706 to the outlet 726. The flow limiter 706 acts to restrict the amount of fluid that passes out of the system 700 through the outlet 726. The sensor 710 measures the pressure at the flow limiter 706 such that if the pressure exceeds a predetermined threshold amount (e.g., due to a malfunction in the flow limiter 706 or an exceptional surge of liquid through the system 700) then the valve 704 can be adjusted such that the fluid is diverted straight to the waste outlet 720.

The skilled person will appreciate that the system 700 described above is deliberately simplified to provide an example through which the application of an executable graph-based model to a control system can be described. As such, the system 700 is not intended to provide a detailed working embodiment of a fluidic control system but is rather illustrative for the purpose of explaining the functionality and benefits of the executable graph-based model when applied to such real-world systems. Moreover, the system 700 is not intended to be limiting and the skilled person will appreciate that executable graph-based models can be applied to any suitable application area or problem domain.

To avoid damage to components connected to the outlet 726 of the system 700, the sensor 710 of the flow limiter 706 requires real-time pressure monitoring. Furthermore, a low latency response to instruct the valve 704 to direct fluid to the waste outlet 720 should be made to limit damage to components as a result of potential surges. The executable graph-based model as described above in relation to FIGS. 3, 4A and 4B provides such a low latency, real-time, system as described below.

Figure 7B:
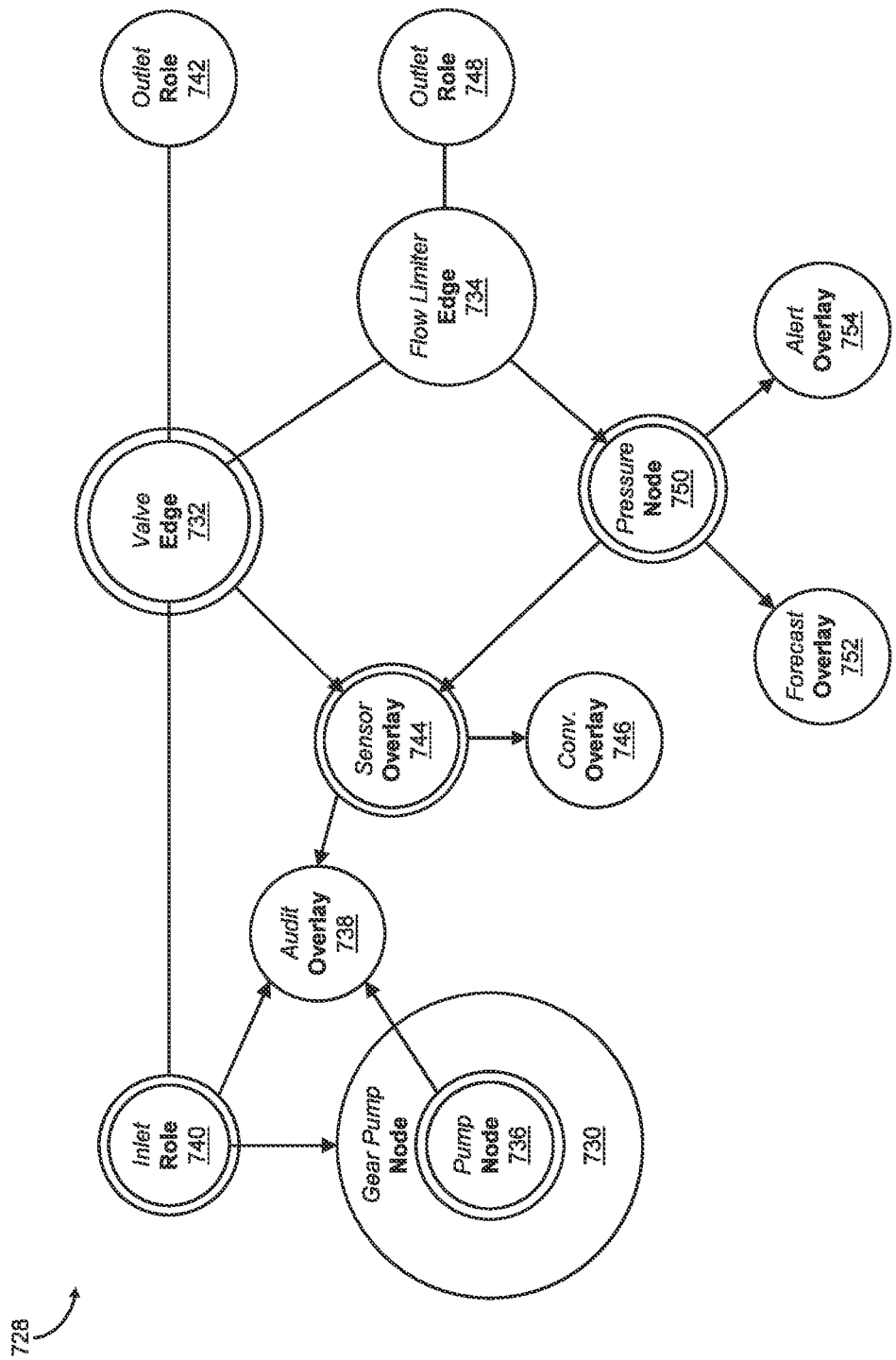

FIG. 7B shows an executable graph-based model 728 of the system 700 illustrated in FIG. 7A.

The executable graph-based model 728 comprises a gear pump node 730, a valve edge node 732, and a flow limiter edge node 734. The gear pump node 730 extends a pump node 736 which is an executable node (as indicated by the outer circle encompassing the pump node 736) having an audit overlay node 738. The valve edge node 732 comprises an inlet role node 740 and an outlet role node 742. As such, the valve edge node 732 defines the connective relationship between the gear pump node 730, the flow limiter edge node 734, and the outlet role node 742. The valve edge node 732 is an executable node having a sensor overlay node 744 (which is itself an executable node comprising the audit overlay node 738 and a conversion overlay node 746). The inlet role node 740 is an executable node having the audit overlay node 738. The valve edge node 732 has a further role (not shown) which connects to the flow limiter edge node 734. The flow limiter edge node 734 has an outlet role node 748 and a further role (note shown) which connects to a pressure node 750. The pressure node 750 is an executable node which has an overlay structure comprising the sensor overlay node 744, a forecast overlay node 752 and an alert overlay node 754.

The gear pump 702, the valve 704, and the flow limiter 706 of the system 700 shown in FIG. 7A are modelled in the executable graph-based model 728 by the gear pump node 730, the valve edge node 732, and the flow limiter edge node 734.

In general, the executable graph-based model 728 periodically receives sensor readings from components of the system 700 shown in FIG. 7A and uses these sensor readings to update the (observed) states of one or more nodes within the executable graph-based model 728. For example, a pressure value for the flow limiter 706 shown in FIG. 7A may be received every 1 second and used to update a value for a pressure attribute of the pressure node 750. Because the data and processing logic of the executable graph-based model 728 are integrated, the forecast overlay node 752 of the pressure node 750 utilizes the updated value of the pressure attribute of the pressure node 750 along with a suitable model of the system (e.g., a state space model, machine learning model, or the like) to predict, or forecast, a pressure at the flow limiter 706 at a future time point (e.g., 1 second in the future, 2 seconds in the future, 5 seconds in the future, or the like). The alert overlay node 754 of the pressure node 750 then issues an alert if the predicted pressure value at the future time point exceeds a predetermined threshold. This alert may then be used to adjust or control the valve 704 and divert the fluid to the waste outlet 720.

FIG. 7B also illustrates further functionality of the executable graph-based model 728. For example, the audit overlay node 738 logs state changes made to the pump node 736, the inlet role node 740, and the sensor overlay node 744. For example, when the executable graph-based model 728 is first executed, the audit overlay node 738 may record details related to the pump node 736 and the inlet role node 740 to a log. In addition, sensor readings received by the sensor overlay node 744 may also be recorded to the log. The conversion overlay node 746 shown in FIG. 7B is configured to transform the sensor measurements received by the sensor overlay node 744 (e.g., convert from one unit of measurement to another).

Figure 7C:
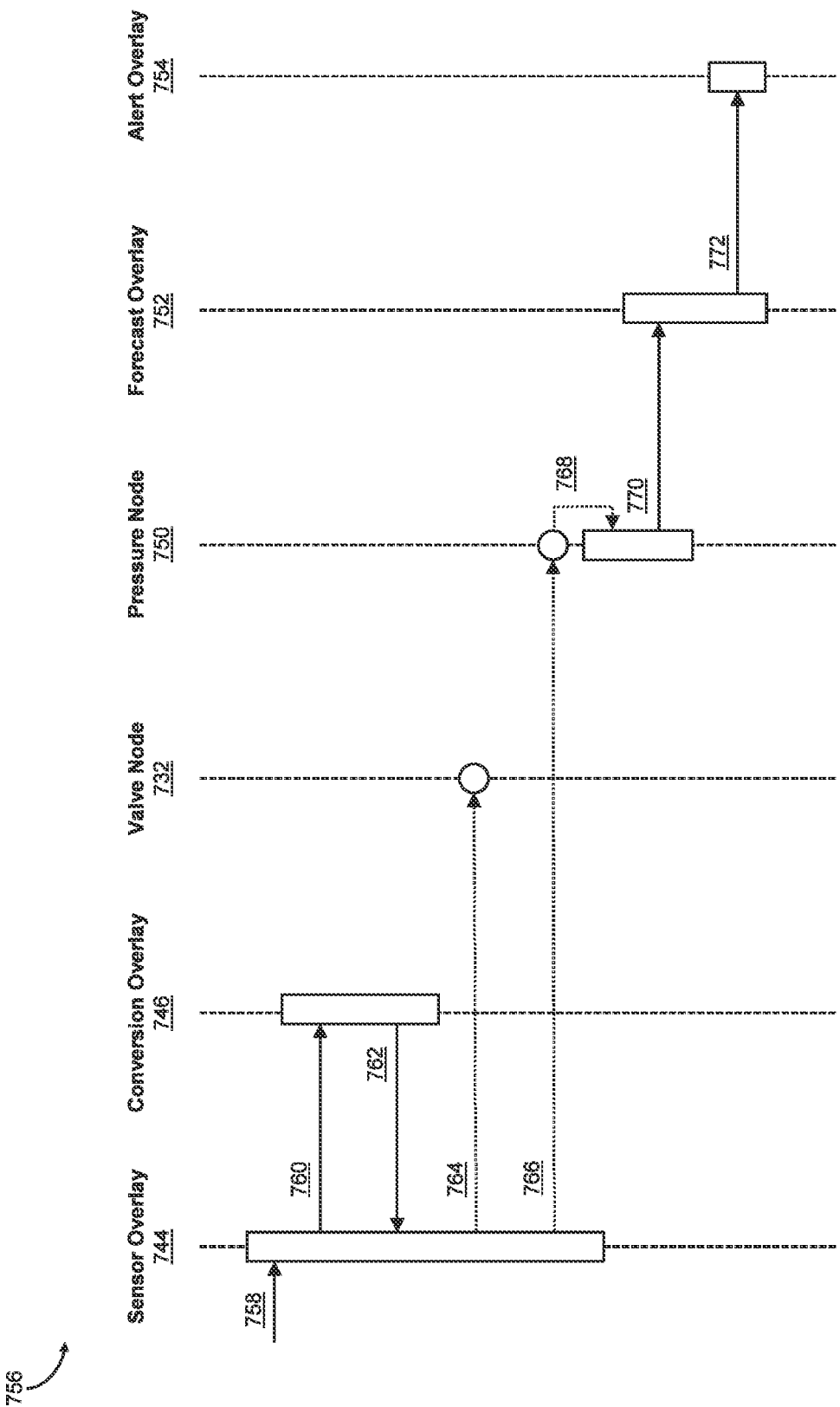

FIG. 7C shows a sequence diagram 756 of an example execution of the executable graph-based model 728 shown in FIG. 7B.

The sequence diagram 756 shown in FIG. 7C illustrates an example execution sequence involving the sensor overlay node 744, the conversion overlay node 746, the valve edge node 732, the pressure node 750, the forecast overlay node 752, and the alert overlay node 754 of the executable graph-based model 728 shown in FIG. 7B.

The execution sequence starts with a stimulus 758 being received by the sensor overlay node 744. Within the context of the wider system within which the executable graph-based model functions (e.g., the system 300 shown in FIG. 3), the stimulus 758 and corresponding context are received by the system and processed by a stimuli management module (e.g., the stimuli management module 312 of the system 300). The stimuli management module 312 is communicatively coupled to the relevant overlay managers of the nodes within the executable graph-based model (e.g., the overlay manager 456 shown in FIG. 4B) such that the stimuli management module 312 is operable to pass the stimulus and context to the relevant overlay management module which then passes the stimulus and context to the relevant overlay(s) for processing/execution. In the example shown in FIG. 7C, the effect of the above process is that the stimulus and context cause execution of the processing logic of the sensor overlay node 744.

As shown in FIG. 7C, upon receiving the stimulus 758 at the sensor overlay node 744, a further stimulus 760 is fired which causes execution of the processing logic of the conversion overlay node 746. In one embodiment, the further stimulus 760 is fired and the processing logic of the conversion overlay node 746 is executed prior to the processing logic of the sensor overlay node 744 being executed. For example, the overlay manager of the pressure node 750 (which is the base node of the sensor overlay node 744 and the conversion overlay node 746) is configured to cause execution of the processing logic of the conversion overlay node 746 prior to causing execution of the processing logic of the sensor overlay node 744 when stimuli having certain context(s) are received (e.g., if the context associated with a stimulus indicates that the stimulus is a sensor reading). In an alternative embodiment, the further stimulus 760 is fired as part of the execution of the processing logic of the sensor overlay node 744. For example, the sensor overlay node 744 determines from the sensor reading that a conversion of the reading is required.

A stimulus 762 is fired once the conversion overlay node 746 has finished transforming the sensor reading which results in the sensor overlay node 744 firing a first stimulus with context 764 or a second stimulus with context 766. The first stimulus with context 764 is fired if the context associated with the stimulus 758 indicates that the sensor reading is associated with the valve 704. The first stimulus with context 764 results in a value of an attribute of the valve edge node 732 being updated. The second stimulus with context 766 is fired if the context associated with the stimulus 758 indicates that the sensor reading is associated with the flow limiter 706. The second stimulus with context 766 results in a value of an attribute of the pressure node 750 (which is associated with the flow limiter edge node 734 as shown in FIG. 7B) being updated.

As shown in FIG. 7C, in consequence of the value of the attribute of the pressure node 750 being set, a stimulus 768 is fired which causes execution of the processing logic of the pressure node 750. Consequently, a stimulus 770 is fired which causes execution of processing logic of the forecast overlay node 752. As stated above, the processing logic of the forecast overlay node 752 is configured to predict a future pressure of the flow limiter 706 based on the current state of the system 700 (i.e., based on the sensor readings). After the forecast has been made a stimulus 772 is fired if the predicted future pressure exceeds a predetermined threshold. The stimulus 772 causes execution of the processing logic of the alert overlay node 754.

Thus, the executable graph-based model 728 provides a reusable, scalable, and efficient approach to modelling and processing data. Because the data and data processing logic is separate while offline, the two components can be managed separately by their respective owners. Because the executable graph-based model 728 integrates the data and the data processing functionality at run-time, the model is able to respond efficiently to stimuli and therefore reduce the latency of the system.

The visualization of the executable graph-based model 728 shown in FIG. 7B corresponds to a visual representation of various elements within an executable graph-based model. As will be described in more detail below in relation to FIGS. 8 and 9, this visual representation, and the corresponding interactive user interface functionality, provides an efficient man-machine interface for exploring the functional structure of an executable graph-based model whilst maintaining the contextual information provided by the topological layout of the graph (i.e., the knowledge graph component).

Figure 8:
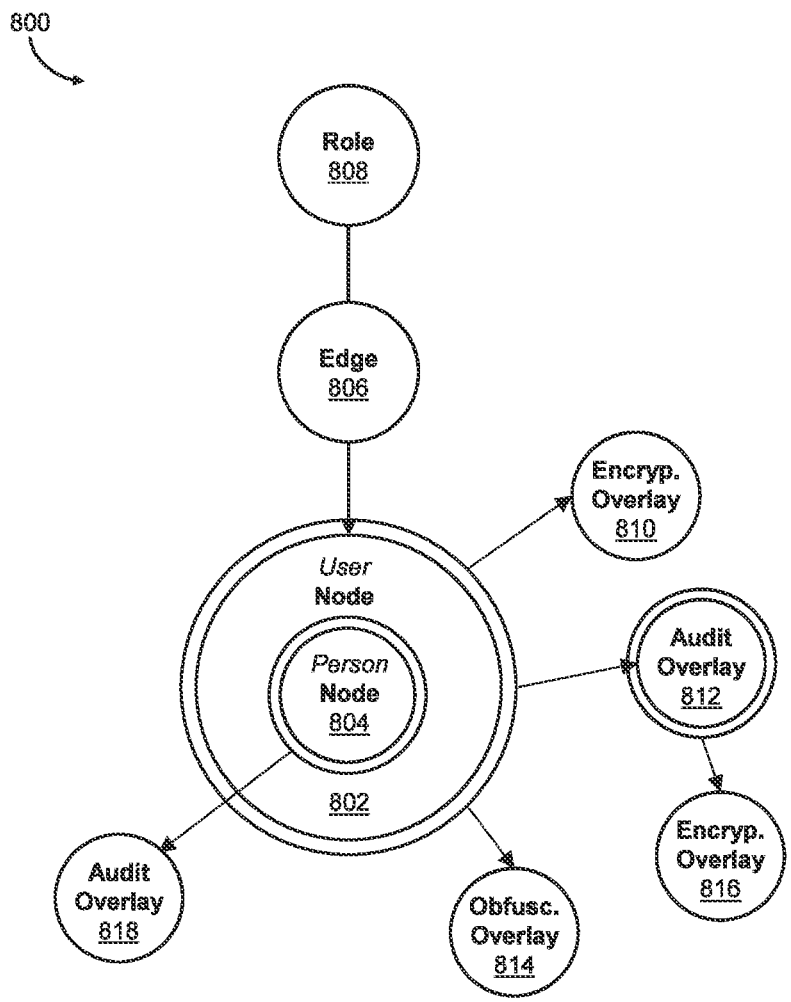
FIG. 8 shows an example executable graph-based model, according to an embodiment of the present disclosure.

FIG. 8 shows an executable graph-based model 800, according to an embodiment of the present disclosure.

The executable graph-based model 800 comprises a user node 802 which extends a person node 804. The user node 802 is connected to an edge node 806 via a role (not shown). The edge node 806 further connects a second node (node shown) via a role node 808. The user node 802 is an executable node comprising an encryption overlay node 810, an audit overlay node 812, and an obfuscation overlay node 814. The audit overlay node 812 is an executable node comprising an encryption overlay node 816. The person node 804 is an executable node comprising an audit overlay node 818.

The executable graph-based model 800 shown in FIG. 8 includes a complex overlay structure and a complex node structure. The user node 802, which is an executable node comprising multiple overlay nodes, extends the person node 804 which is itself an executable node comprising an overlay. Moreover, the audit overlay node 812 of the user node 802 is an executable node comprising an overlay. Therefore, the overlay and node structure comprise a form of hierarchical structure which cannot be easily visualized in conjunction with other elements of the executable graph-based model 800 without causing visual clutter or losing key contextual information (e.g., by hiding or occluding parts of the executable graph-based model to display the overlay structure).

FIGS. 9A-9G illustrate the visualization of hierarchical overlay structures, according to an embodiment of the present disclosure.

Figure 9A:
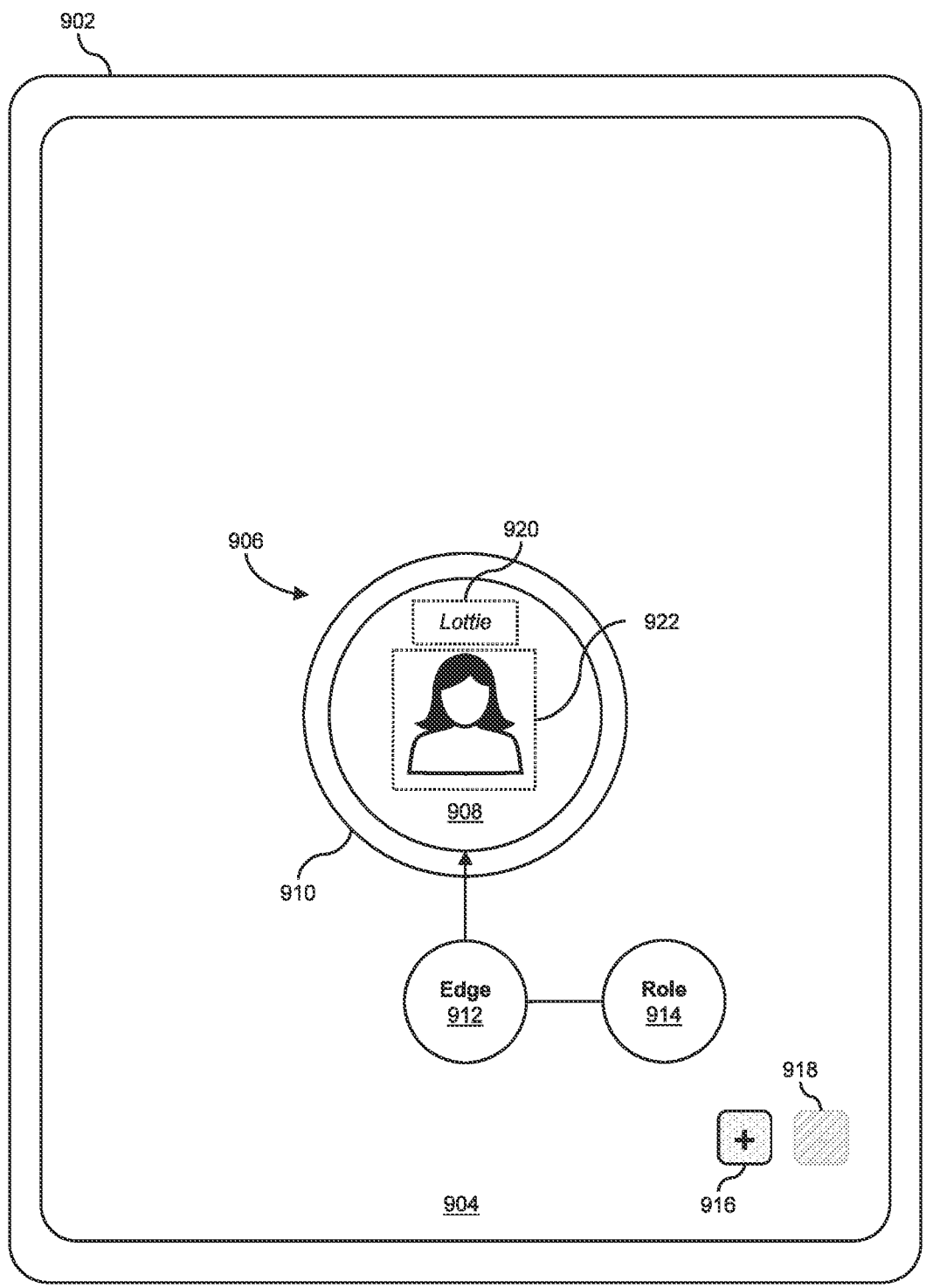
FIGS. 9A-9G illustrate the interactive visualization of the example executable graph-based model shown in FIG. 8, according to an embodiment of the present disclosure.

FIG. 9A shows a device 902 upon which a user interface 904 is displayed. A graphical representation 906 of an executable node is displayed within the user interface 904. The graphical representation 906 comprises a first display element 908 and a second display element 910. A graphical representation 912 of an edge node and a graphical representation 914 of a role node are also displayed within the user interface 904. A first selector 916 and a second selector 918 are also displayed within the user interface 904. The first display element 908 comprises a label 920 and an icon 922.

The graphical representation 906 of the executable node, the graphical representation 912 of the edge node, and the graphical representation 914 of the role node correspond to visual representations of nodes within the executable graph-based model shown in FIG. 8. As such, the graphical representation 906 is associated with the executable node comprising the composition of the user node 802 and its associated overlays. Specifically, the first display element 908 is associated with the user node 802 and the second display element 910 is associated with the overlays of the user node 802. The graphical representation 906 provides a visualization of the executable node at a first level of detail whereby the information conveyed is simplified—i.e., a user of the device 902 is informed that the user node represented by the first display element 908 comprises at least one associated overlay because the graphical representation 906 further comprises a second display element 910 in the form of a shape (i.e., a circle) encompassing the first display element 908. This is in contrast to the graphical representation 912 of the edge node and the graphical representation 914 of the role node which are identified as being non-executable nodes because the graphical representations comprise only a single display element.

The label 920 and the icon 922 provide information regarding the node associated with the first display element 908. In this example, the label 920 corresponds to a value of a first name attribute of user node associated with the first display element 908 (i.e., the user node 802 shown in FIG. 8). The icon 922 is indicative of a property of the user node associated with the first display element 908—in this instance, the icon 922 indicates the associated user node is a female.

Figure 9B:
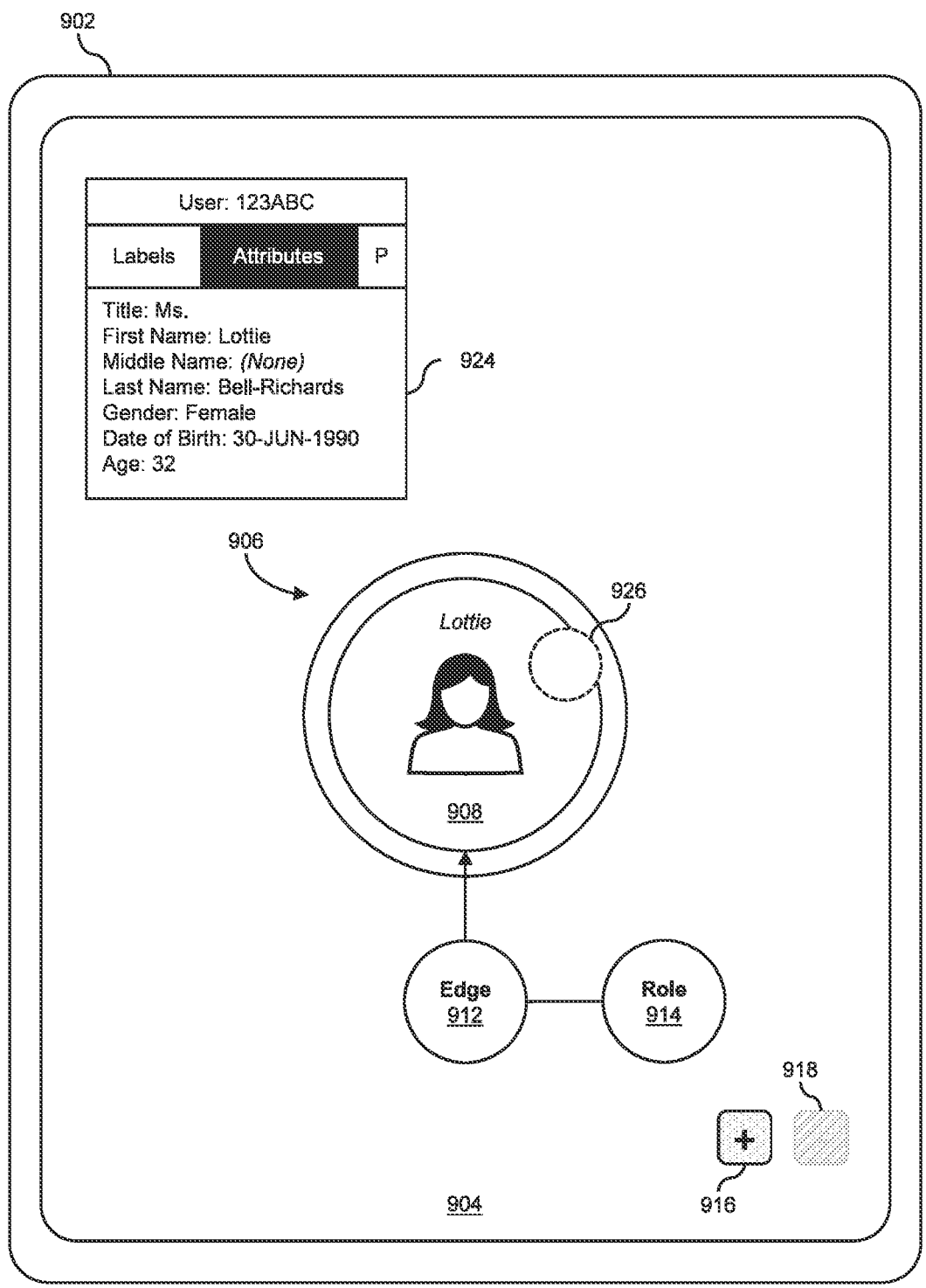

Further attributes and features associated with nodes displayed within the user interface 904 are viewable via an information window as illustrated in FIG. 9B.

FIG. 9B shows the user interface 904 illustrated in FIG. 9A with the additional of an information window 924.

The information window 924 is display within the user interface 904 as a result of a user input 926 being received. In this example, the user input 926 is a touch or selection gesture (e.g., via a mouse or other pointing device) at a location within the user interface 904 corresponding to the first display element 908. As such, the user input 926 corresponds to a selection by a user of the device 902 of the first display element 908 (i.e., a selection to view more information regarding the user node represented by the first display element 908).

The information window 924 displays the attributes and attribute values associated with the selected node. The information window also includes tabs for describing and configuring all other aspects of the selected node.

In addition to being provided with a mechanism by which to explore the attributes of nodes within the executable graph-based model (i.e., view the data component, or knowledge graph component, of the executable graph-based model), according to an embodiment of the present disclosure a user is also able to explore the functional structure of the executable graph-based model whilst maintaining the relational structure of the executable graph-based model.

As stated above, the graphical representation 906 of the executable node is displayed at a first—simplified—level of detail. That is, the overlay structure associated with the user node (i.e., the encryption overlay node 810, the audit overlay node 812, the obfuscation overlay node 814 and the audit overlay node 818 associated with the user node 802 and the person node 804 shown in FIG. 8) is represented solely by the second display element 910. A user explores different levels of detail of the overlay structure by means of the first selector 916 and the second selector 918.

In the example shown in FIG. 9B, the first selector 916 and the second selector 918 correspond to interactive display elements (e.g., buttons, selectors, or the like) which are displayed at a predetermined and location within the user interface 904. In other embodiments, the first selector and the second selector are displayed at other locations within the user interface 904 or the functionality afforded by these selectors are provided by means of other input mechanisms such as speech input, text-based commands, interaction with physical buttons or elements of the device 902 and the like.

In general, the first selector 916 is used to increase the level of detail of the visual display of the overlay structure of one or more executable nodes within the executable graph-based model whilst the second selector 918 is used to decrease the level of detail of the visual display of this overlay structure. In FIGS. 9A and 9B, the second selector 918 is visually different to the first selector 916 indicating the second selector 918 is disabled because the executable graph-based model is being displayed at the simplest level of detail.

Figure 9C:
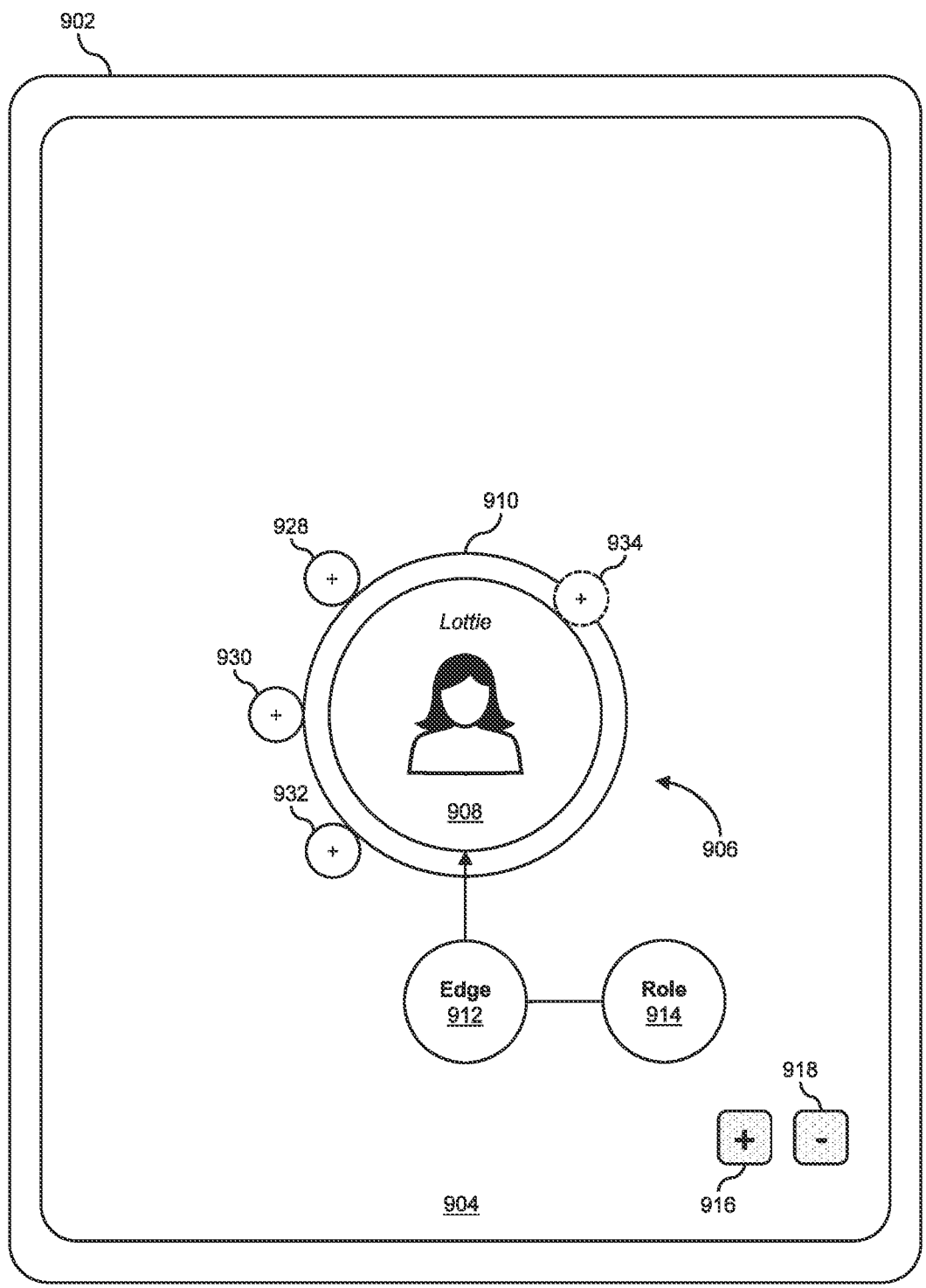

To increase the level of detail of the visualization of the overlay structure, a user selects the first selector 916 resulting in the display shown in FIG. 9C.

FIG. 9C shows the overlay structure of the executable node associated with the graphical representation 906 at a second level of detail. The second level of detail is greater than the first level of detail shown in FIGS. 9A and 9B.

The graphical representation 906 of the executable node shown at the second level of detail in FIG. 9C comprises a display element which includes a plurality of visual indicators 928-932 associated with a plurality of overlays within the overlay structure. The plurality of visual indicators 928-932 are proximate to, and optionally contiguous with, the graphical representation 906. The display element optionally comprises a further visual indicator 934 associated with an overlay associated with the base executable node which the executable node represented by the graphical representation 906 extends. The display element shown in FIG. 9C also includes the second display element 910. As such, the display element shown in FIG. 9C represents the overlay structure of the executable node at a second level of detail greater than the first level of detail.

When comparing the first level of detail shown in FIGS. 9A and 9B with the second level of detail shown in FIG. 9C, it can be seen that more information regarding the overlay structure associated with the executable node is displayed at the second level of detail. The user is provided with information regarding the number of overlays there are that are associated with the executable node by means of the display of the plurality of visual indicators 928-932 (and optionally the further visual indicator 934).

The plurality of visual indicators 928-932 are visually associated with the executable node by their position relative to the graphical representation 906. That is, the plurality of visual indicators 928-932 are displayed along an edge, or perimeter, of the second display element 910. In this way, the user is provided with immediate visual feedback linking the overlays represented by the plurality of visual indicators 928-932 with the node to which they relate—in this case, they are all overlays of the node represented by the first display element 908. This is in contrast to the further visual indicator 934 which is displayed along an edge, or perimeter, of the first display element 908 thus indicating that the overlay represented by the further visual indicator 934 is associated with a (hidden) base node which the node represented by the first display element 908 extends (in the example shown in FIG. 8, the further visual indicator 934 is associated with the audit overlay node 818 of the person node 804, which is the base node of the user node 802).

As can be seen from FIG. 9C, the overlay structure of the executable graph-based model is displayed at a second level of detail whilst maintaining display of the first display element 908, the graphical representation 912 of the edge node and the graphical representation 914 of the role node. As such, the functionality of the executable graph-based model (i.e., the overlay structure) can be explored whilst maintain the integrity of the display of the knowledge graph portion of the executable graph-based model (i.e., the topology of the graph). This provides an efficient man machine interface since a user is able to expand and collapse portions of the overlay structure whilst retaining a visual representation of the overall layout of the executable graph-based model.

In the example shown in FIG. 9C, the second selector 918 is no longer disabled thereby enabling a user to decrease the level of detail of the overlay structure displayed within the user interface 904. Selection of the second selector 918 when the overlay structure is displayed at the second level of detail (as shown in FIG. 9C) would thus result in the overlay structure being presented at the first level of detail (as shown in FIGS. 9A and 9B).

Figure 9D:
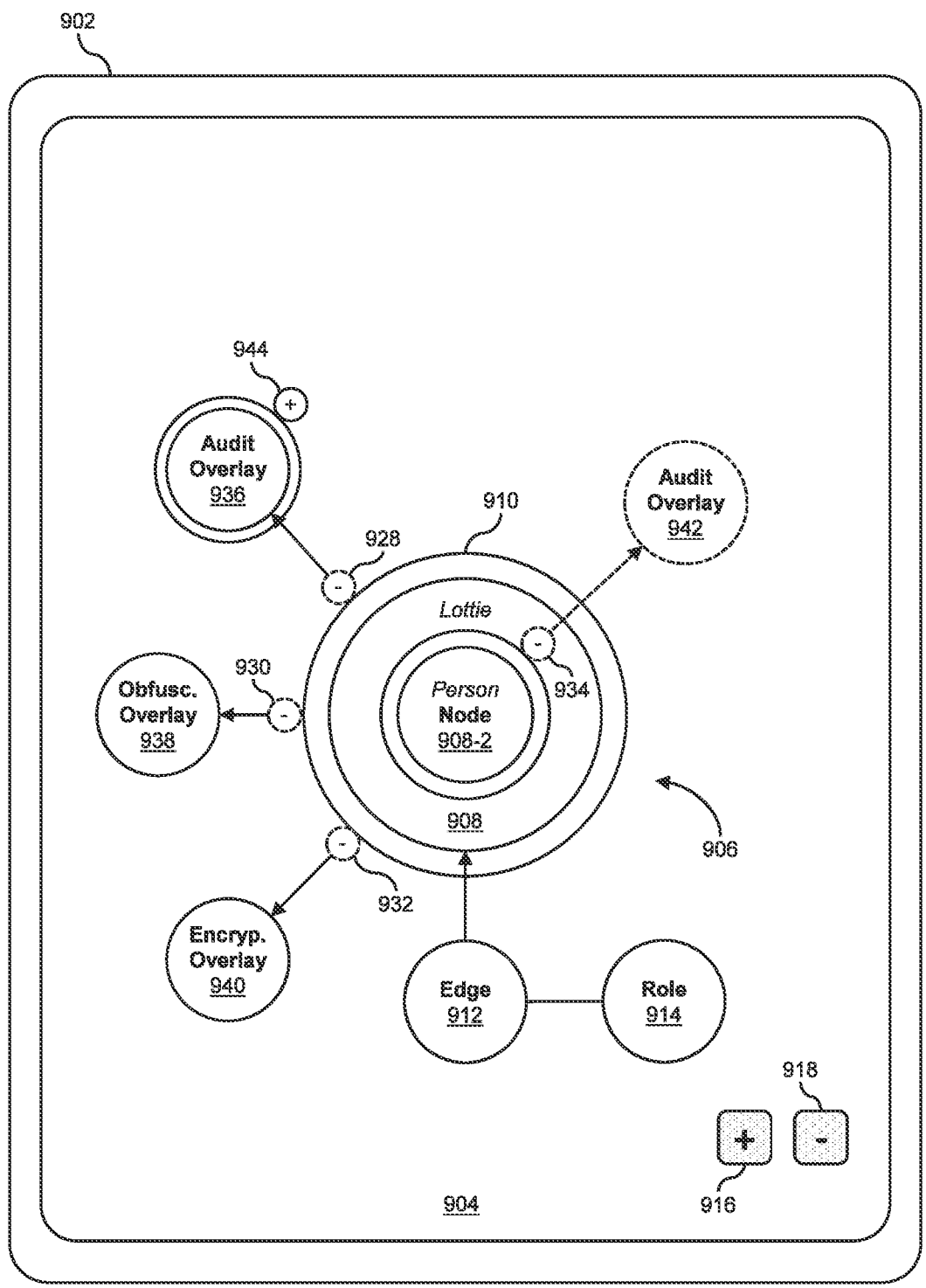

Selection of the first selector 916 (e.g., by means of a user input upon or in relation to the first selector 916) whilst the overlay structure is displayed at the level of detail shown in FIG. 9C results in the level of detail of the overlay structure increasing as shown in FIG. 9D.

FIG. 9D shows the overlay structure of the executable node associated with the graphical representation 906 at a third level of detail. The third level of detail is greater than the second level of detail shown in FIG. 9C.

The graphical representation 906 of the executable node shown at the third level of detail in FIG. 9D comprises a display element which includes a plurality of further display elements 936-940 associated with a plurality of overlay nodes within the overlay structure. The display element thus comprises a structural representation of the overlay structure. The display element optionally comprises an additional display element 942 associated with the audit overlay of the base node. In one embodiment, the display element shown in FIG. 9D also includes the plurality of visual indicators 928-932. However, the plurality of visual indicators 928-932, when acting as selectors, now decrease the level of detail of the overlay structure (as described in more detail below). As can be seen in FIG. 9D, the graphical representation 906 further includes a display element 908-2 associated with the person node (i.e., the base node from which the user node represented by the first display element 908 is extended). As such, at this level of detail a user is able to discern that the audit overlay (as represented by the additional display element 942) is associated with the person node (as represented by the display element 908-2).

As shown in FIG. 9D because the audit overlay associated with the display element 936 of the plurality of further display elements 936-940 is an executable node (i.e., an overlay node having an overlay node associated therewith) a visual indicator 944 is displayed. The visual indicator 944 indicates to a user that the overlay structure related to the audit overlay (i.e., related to the display element 936) can be further explored. The visual indicator 944 is thus a selector which a user may select (i.e., click or press) to expand the level of detail as shown in FIG. 9E.

Figure 9E:
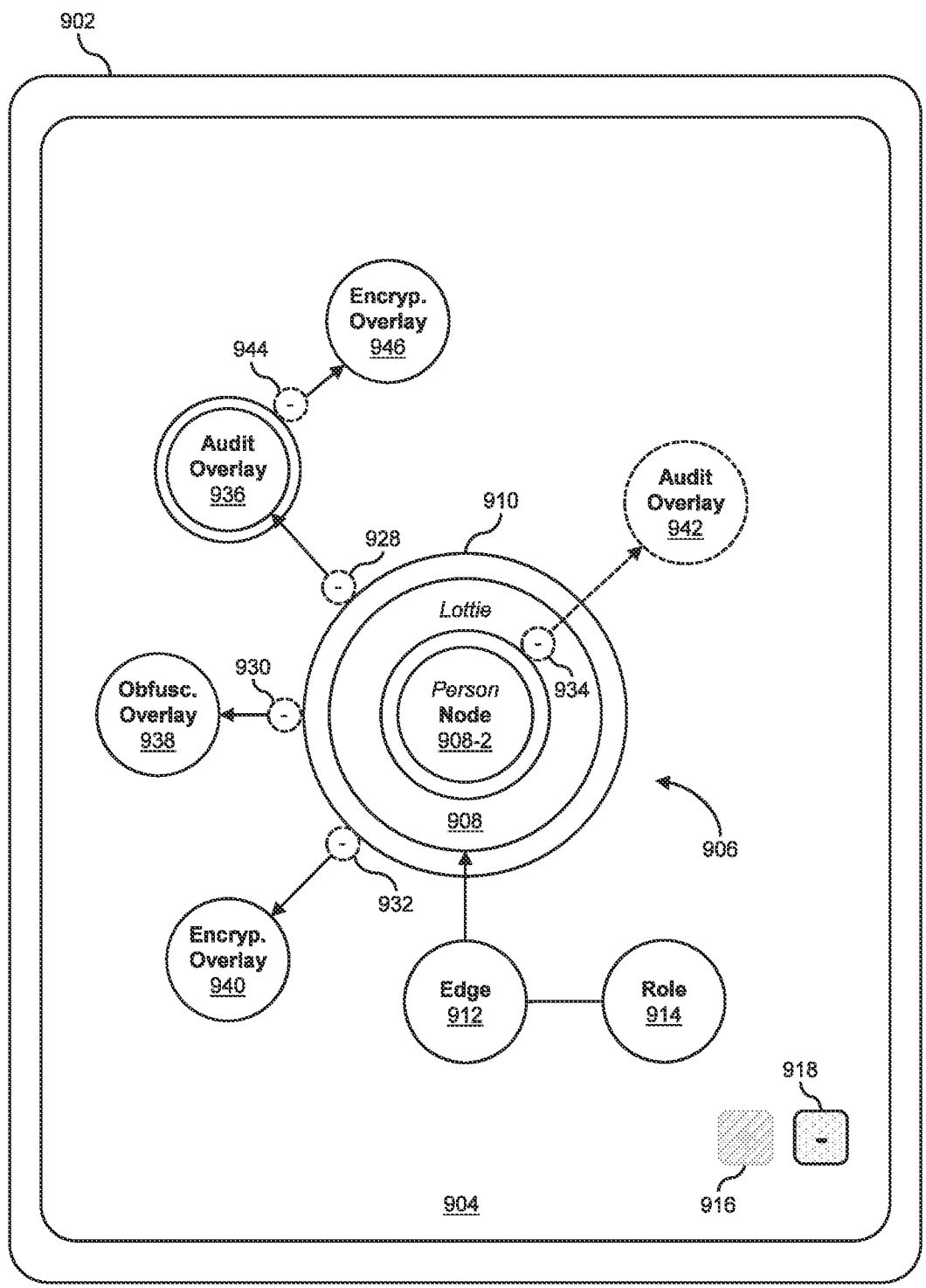

FIG. 9E shows the overlay structure of the executable node associated with the graphical representation 906 at a fourth level of detail. The fourth level of detail is greater than the third level of detail shown in FIG. 9D. At the fourth level of detail, a display element 946 is shown which replaces the display element (i.e., the visual indicator 944) shown at the third level of detail. The display element 946 reveals that the audit overlay associated with the display element 936 comprises an encryption overlay associated with the display element 946.

Because the fourth level of detail corresponds to the greatest (i.e., most complex) level of detail that can be displayed, the first selector 916 is disabled. However, selection of the second selector 918 would result in the overlay structure being displayed at the third level of detail as shown in FIG. 9C.

The above examples shown in FIG. 9A-9E relate to a global change in the level of detail of the overlay structure. That is, selection of the first selector 916 or the second selector 918 result in the level of detail of all overlays (overlay nodes) within the overlay structure being changed. This is illustrated most clearly in the transition from the second level of detail shown in FIG. 9C to the third level of detail shown in FIG. 9D. In some embodiments, the first selector 916 and the second selector 918 increase the level of detail of all overlay structures within the executable graph-based model displayed within the user interface 904. However, a user is able to explore a portion of an overlay structure by means of the visual indicators.

Figure 9F:
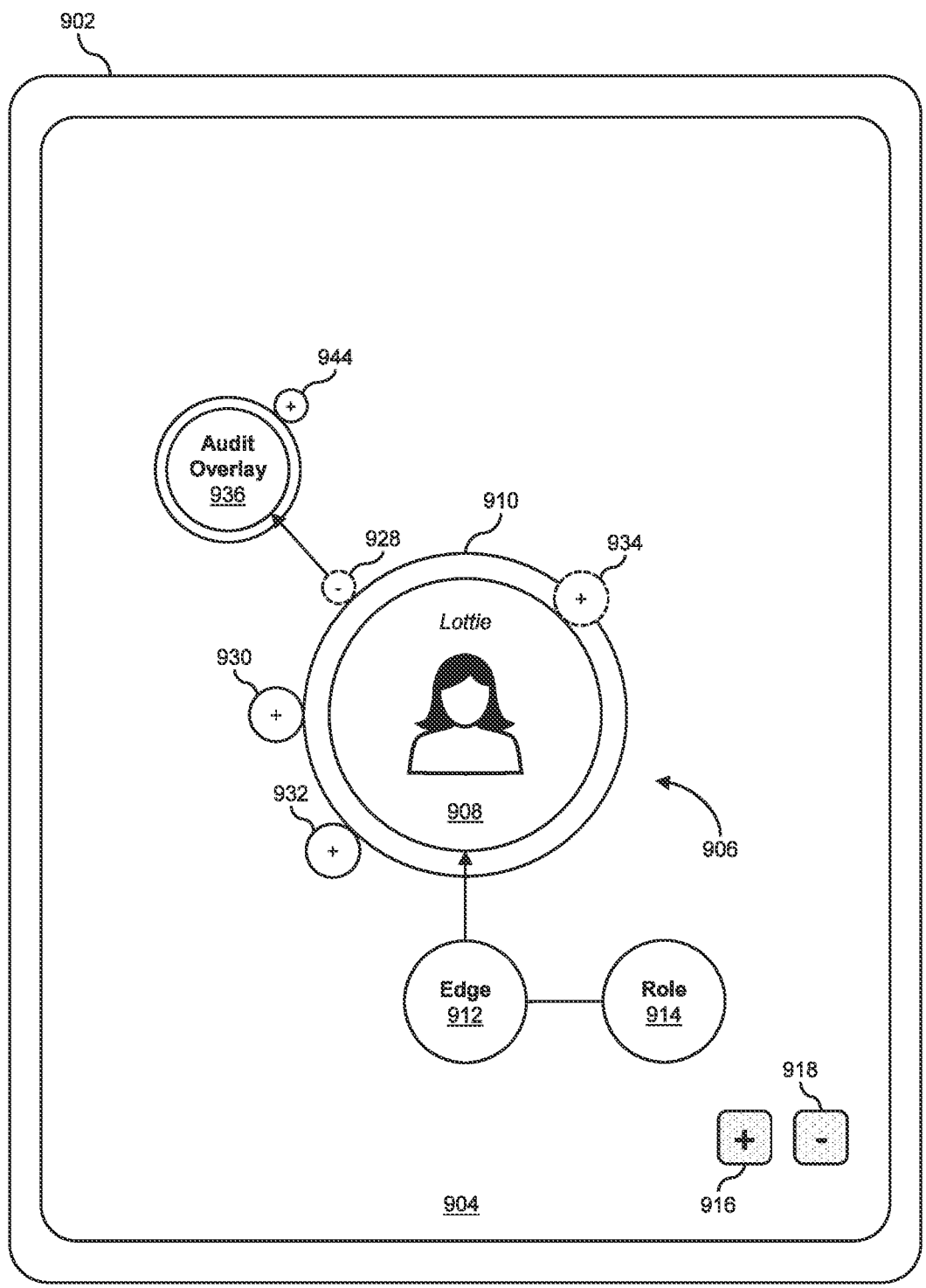

FIG. 9F shows the user interface 904 of FIG. 9C (at the second level of detail) after a user selection of the first visual indicator 928 of the plurality of visual indicators 928-932.

In consequence of the user selection of the first visual indicator 928 the overlay structure related to the audit overly (represented by the first visual indicator 928) is expanded and shown at a further level of detail. As such, the first visual indicator 928 shown in FIG. 9C is replaced by the display element 936 associated with the audit overlay. In some embodiments, the first visual indicator 928 also changes so as to indicate that the local overlay structure can be collapsed. In FIG. 9F this is shown by the first visual indicator 928 which corresponds to a selectable icon with a "-" sign. Selection of the first visual indicator 928 by a user results in the user interface 904 shown in FIG. 9C being display.

Because the audit overlay represented by the display element 936 is an overlay with overlay, the user is provided with the visual indicator 944 which can be selected to further explore the local overlay structure of the audit overlay node.

Figure 9G:
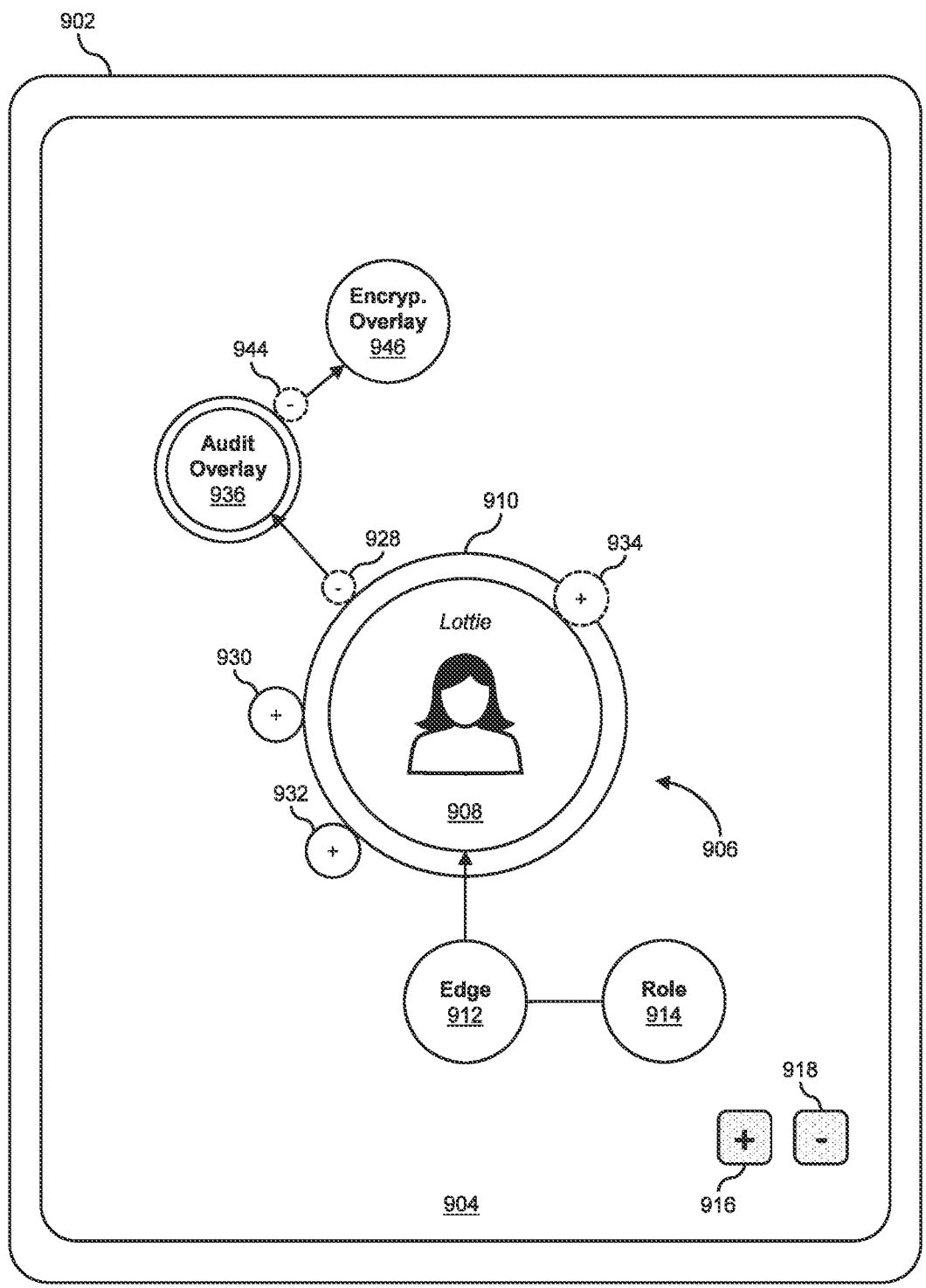

Selection of the visual indicator 944 results in the user interface 904 shown in FIG. 9G which shows the user interface 904 shown in FIG. 9F but with the addition of a display element 946 associated with the encryption overlay of the audit overlay associated with the display element 936. In some embodiments, the visual indicator 944 also changes so as to indicate that the local overlay structure can be collapsed. In FIG. 9G this is shown by the visual indicator 944 which corresponds to a selectable icon with a "-" sign. Selection of the visual indicator 944 by a user results in the user interface 904 shown in FIG. 9F being display.

The description will now turn to methods which operate in conjunction with the systems and functionality described above.

Figure 10:
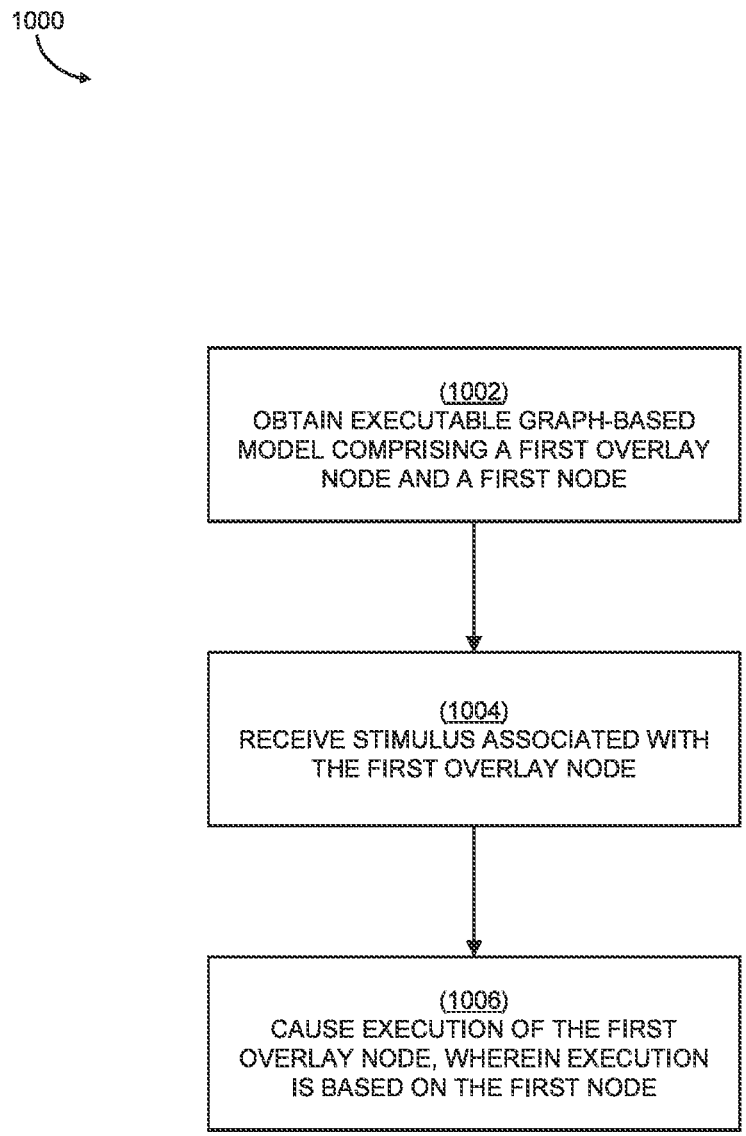
FIG. 10 shows a method for execution of executable graph-based models, according to an embodiment of the present disclosure.

FIG. 10 shows a method 1000 for execution of executable graph-based models, according to an embodiment of the present disclosure.

The method 1000 comprises the steps of obtaining 1002 an executable graph-based model, receiving 1004 a stimulus, and causing 1006 execution of an overlay node based on the received stimulus. In one embodiment, the method 1000 is performed by a system such as the system 300 described above in relation to FIG. 3.

In general, the method 1000 describes the execution process of an executable graph-based model. As stated previously, an executable graph-based model combines data and data processing functionality at run-time whilst maintaining their separability when at rest. The executable graph-based model provides clear separation of data and data processing functionality thereby allowing data owners greater control over the data used by such models. Furthermore, the integration of the data and the data processing functionality with a single model helps reduce the latency between stimuli being received, processing logic being executed, data being accessed, and outcomes being produced. Therefore, the executable graph-based model of the method 1000 is an efficient data structure which reduces processing delays or latency.

At the step of obtaining 1002, an executable graph-based model is obtained. The executable graph-based model comprises a first overlay node and a first node having the first overlay node associated therewith. The first overlay node comprises processing logic operable to interact with one or more associated nodes of the executable graph-based model.

The executable graph-based model obtained at the step of obtaining 1002 corresponds to any suitable executable graph-based model described in the present disclosure. Further description of the architecture and functionality of a node, an overlay node, and an executable node is given above in relation to FIGS. 4A and 4B.

At the step of receiving 1004, a first stimulus associated with the first overlay node is received.

Stimuli provide the basis for all interactions within an executable graph-based model. The first stimulus has a type such as a command (e.g., a transactional request), a query, or an event from an internal or external system. The first stimulus is either externally or internally generated (triggered). For example, the first stimulus may be associated with an event related to an external device which is then received by the executable graph-based model. Alternatively, the first stimulus may have been generated by processing logic within the executable graph-based model.

At the step of causing 1006, execution of said processing logic of the first overlay node is caused in response to the first stimulus being received. Execution of said processing logic of the first overlay node is based on the first node.

In an embodiment, the first stimulus comprises a first context such that execution of the processing logic of the first overlay node is based on the first context. For example, the first context comprises information necessary for the processing logic to be executed.

The first node comprises a state which, in some embodiments, is shared by the first node and a second node of the graph-based model (as described in more detail in relation to FIG. 4A above). The execution of the processing logic caused at the causing 1006 step, can cause a change in the state of the first node. For example, if the first node is a data node comprising an attribute, then the execution of the processing logic can cause a value of the attribute to be set. In a further example, execution of the processing logic can cause a new attribute to be generated for the first node and may also set a value for the new attribute. The execution can also leave the state of the first node unchanged. For example, the execution of the processing logic can cause a value of the attribute to be output.

As stated previously, processing within the executable graph-based model is driven by stimuli. Consequently, execution of the processing logic caused by the causing 1006 step may cause a second stimulus to be generated (fired). For example, a second stimulus associated with a second node within the executable graph-based model is fired and subsequently received by a second overlay node. In consequence of the second stimulus being received, processing logic of the second overlay node is executed.

Figure 11:
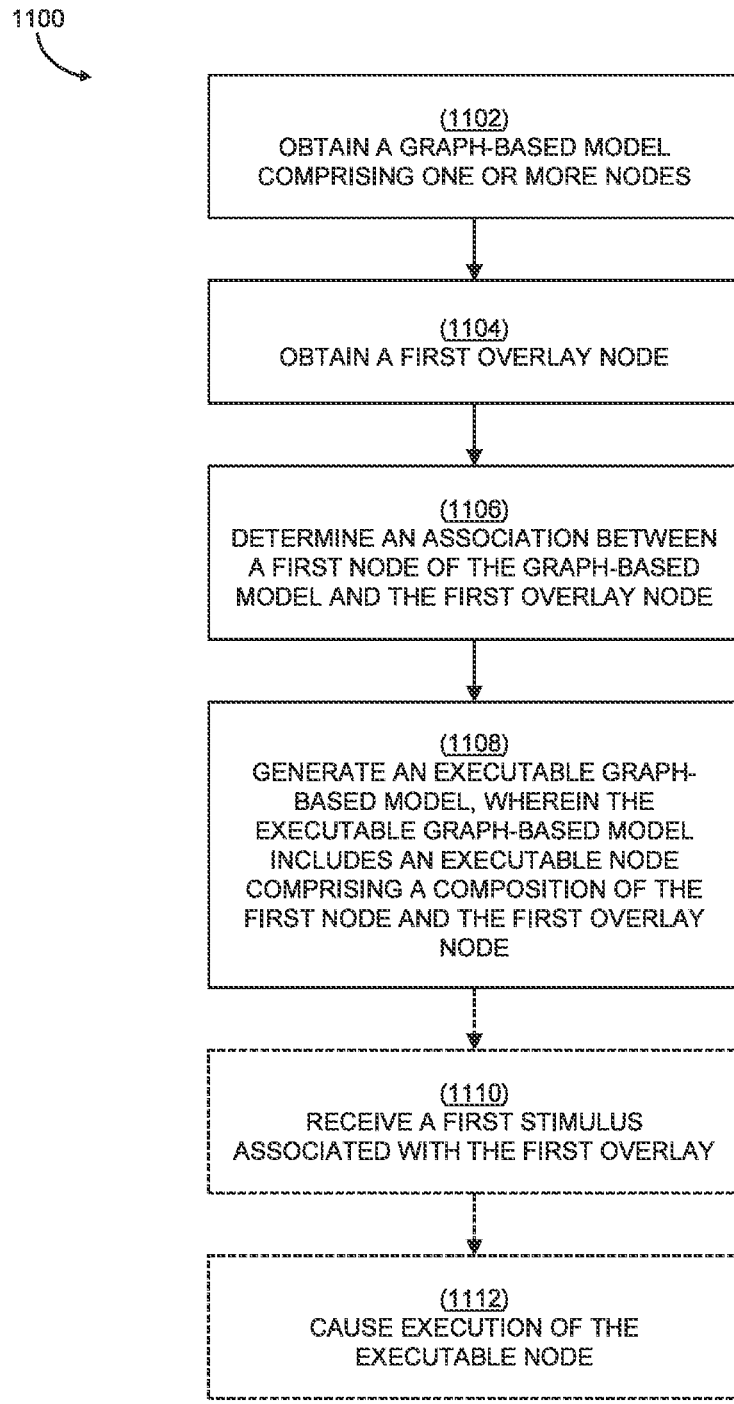
FIG. 11 shows a method for dynamically generating an executable graph-based model, according to an embodiment of the present disclosure.

FIG. 11 shows a method 1100 for dynamically generating an executable graph-based model, according to an embodiment of the present disclosure.

The method 1100 comprises the steps of obtaining 1102 a graph-based model, obtaining 1104 a first overlay node, determining 1106 an association between a first node of the graph-based mode and the first overlay node, and generating 1108 an executable graph-based model. The method 1100 further comprises the optional steps of receiving 1110 a first stimulus and causing 1112 execution based on the first stimulus being received. In one embodiment, the method 1100 is performed by a system such as the system 300 described in relation to FIG. 3 above.

At the step of obtaining 1102, a graph-based model comprising one or more nodes is obtained.

At the step of obtaining 1104, a first overlay node is obtained. The first overlay node comprises processing logic operable to interact with at least one node of an associated graph-based model.

At the step of determining 1106, an association between a first node of the graph-based model and the first overlay node is determined.

At the step of generating 1108, an executable graph-based model is generated. The executable graph-based model includes a first executable node comprising a composition of the first node of the graph-based model and the first overlay node based on the association between the first node of the graph-based model and the first overlay node.

At the optional step of receiving 1110, a first stimulus associated with the first overlay node is received.

At the optional step of causing 1112, execution of said processing logic of the first overlay node is caused in response to the first stimulus being received.

As stated above, the first stimulus can comprise, or be associated with, a context. In such examples, execution of the processing logic of the first executable node is based on the first context. For example, a stimulus associated with an event occurring outside of the system could be handled by different overlays within the executable graph-based model. A context associated with the stimulus can be used to indicate which of the overlays the stimulus (event) relates. In the example described above in relation to FIGS. 7A-7C, the sensor overlay node 744 is operable to receive stimuli associated with sensor readings of the valve 704 or the flow limiter 706. The context associated with stimuli is thus used to identify whether the sensor reading is from the valve 704 or the flow limiter 706.

In one embodiment, execution of the processing logic of the first executable node in response to the first stimulus being received causes a second stimulus to be generate and fired (e.g., sent or broadcast within the system). The second stimulus is associated with a second overlay node within the executable graph-based model. In response to the second stimulus being fired, processing logic associated with the second overlay node is caused to execute.

Figure 12:
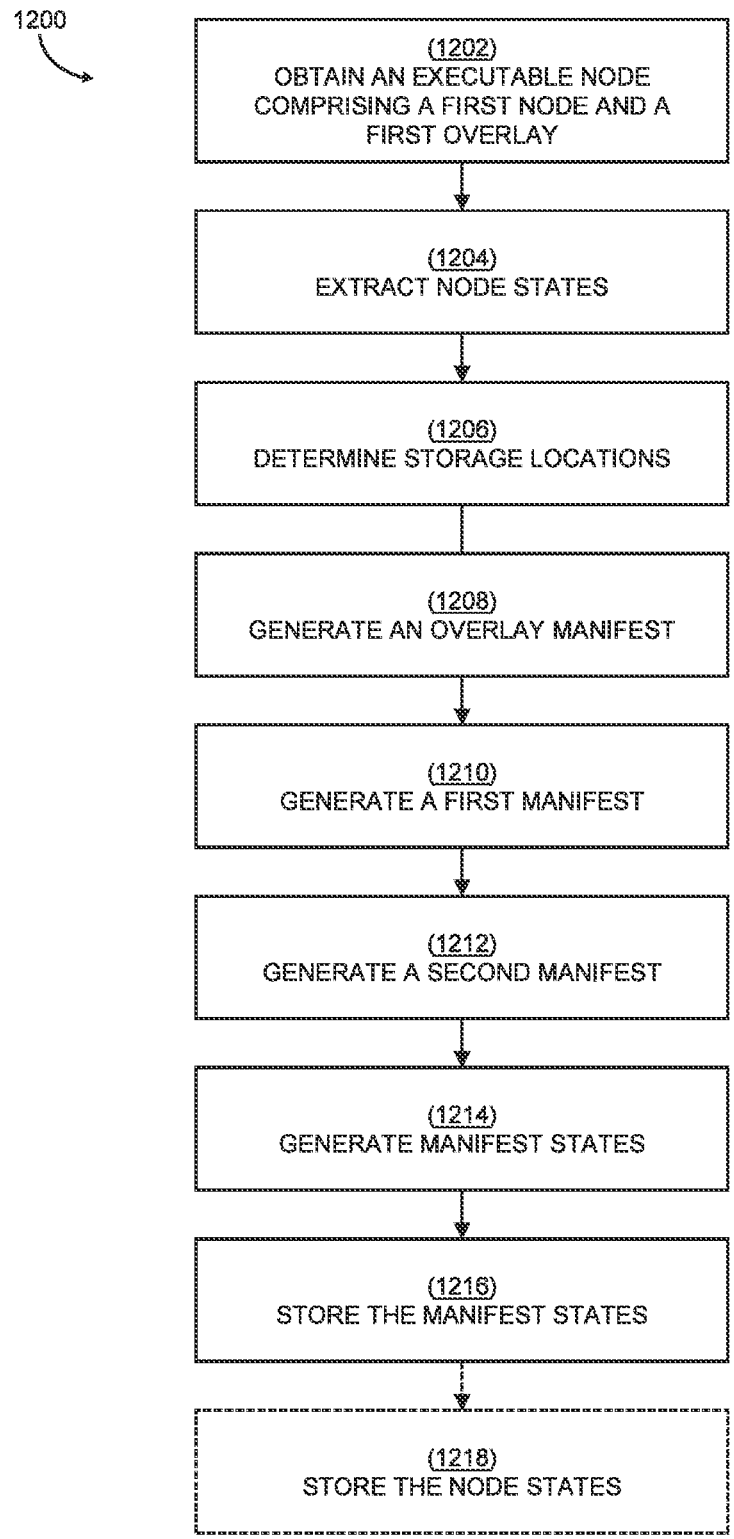
FIG. 12 shows a method for storage management of executable graph-based models, according to an embodiment of the present disclosure.

FIG. 12 shows a method 1200 for storage management of executable graph-based models, according to an embodiment of the present disclosure.

The method 1200 comprises the steps of obtaining 1202 an executable node, extracting 1204 node states, determining 1206 storage locations, generating 1208 an overlay manifest, generating 1210 a first manifest, generating 1212 a second manifest, generating 1214 manifest states, and storing 1216 the manifest states. The method 1200 further comprises the optional step of storing 1218 the node states. In one embodiment, the method 1200 is performed by a system such as the system 300 described above in relation to FIG. 3.

At the step of obtaining 1202, an executable node is obtained. The executable node comprises a composition of a first node and a first overlay node (e.g., the executable node 466 shown in FIG. 4C comprises a composition of the base node 468 and the overlay node 470). The executable node obtained at the obtaining 1202 step forms a part of an executable graph-based model. As such, the obtaining 1202 step may be performed as part of decomposing an executable graph-based model for persistent storage. In embodiments, the first node is associated with a node type such as a data node type, a value node type, an edge node type, or a role node type.

At the step of extracting 1204, a node state is extracted from each of the executable node, the first node, and the first overlay node. That is, a first node state is extracted from the executable node (e.g., the state 472 of the executable node 466 shown in FIG. 4C), a second node state is extracted from the first node (e.g., the state 476 of the base node 468 shown in FIG. 4C), and a third node state is extracted from the first overlay node (e.g., the state 480 of the overlay node 470 shown in FIG. 4C). The node state of the executable node and the node state of the first node both comprise a shared identifier (e.g., the identifier 474 of the state 472 in FIG. 4C is the same as the identifier 478 of the state 476). At the step of determining 1206, a storage location for the node state of each of the executable node, the first node, and the first overlay node is determined. That is, a first storage location is determined for the node state of the executable node, a second storage location is determined for the node state of the first node, and a third storage location is determined for the node state of the first overlay node. Here, determining a storage location corresponds to identifying or determining the file path, or location (e.g., URL), at which the node state will be, or has been, saved. In some embodiments, the optional step of storing 1218 the node states (as described in more detail below) is performed after or as part of the step of determining 1206 the storage locations.

At the step of generating 1208, an overlay node manifest is generated. The overlay node manifest is associated with the first overlay node (e.g., the manifest 488 associated with the overlay node 470 shown in FIG. 4C). The overlay node manifest comprises an overlay identifier (e.g., the identifier 496 shown in FIG. 4C) and the storage location of the node state of the first overlay node. Thus, the overlay node manifest comprises all the information necessary for reconstructing the first overlay node from its constituent components.

At the step of generating 1210, a first node manifest is generated. The first node manifest is associated with the executable node (e.g., the manifest 484 shown in FIG. 4C is associated with the executable node 466). The first node manifest comprises: the shared identifier (e.g., the identifier 490 in FIG. 4C which is the same as the identifier 474), the overlay identifier (e.g., the overlay identifier 492 in FIG. 4C which is the same as the identifier 496), and the storage location for the node state of the executable node. Thus, the first node manifest comprises all the information necessary for reconstructing the executable node from its constituent components.

At the step of generating 1212, a second node manifest is generated. The second node manifest is associated with the first node (e.g., the manifest 486 in FIG. 4C is associated with the base node 468). The second node manifest comprises the shared identifier (e.g., the identifier 494 in FIG. 4C which is the same as the identifier 474, the identifier 478, and the identifier 490) and the storage location for the node state of the executable node. Thus, the second node manifest comprises all the information necessary for reconstructing the first node from its constituent components.

At the step of generating 1214, a manifest state is generated for each of the overlay node manifest, the first node manifest, and the second node manifest. The manifest state generated for the first node manifest and the manifest state generated for the second node manifest both comprise the shared identifier. The manifest states generated at the step of generating 1214 correspond to the lowest level representation of a node (i.e., a manifest state cannot be decomposed into any further part or parts).

At the step of storing 1216, the manifest state for each of the overlay node manifest, the first node manifest and the second node manifest are stored. As such, by decomposing the elements into separate elements using the method 1200, the different elements (i.e., the structure of an executable graph-based model, the functionality of the overlays used by an executable graph-based model, and the data which exists at run-time within an executable graph-based model) can be managed and stored separately.

To verify the integrity of the executable graph-based model, a first verification code is generated for each node state and subsequently associated with the corresponding manifest state such that the corresponding manifest state comprises the first verification code. For example, a first node state associated with a first node comprises a first verification code which is then associated with the manifest state for the first node such that a confirmation can be made during loading that the node state matches the manifest.

At the optional step of storing 1218, the node state of each of the executable node and the first node are stored at their respective storage locations. As stated above, the step of storing 1218 is performed as part of (or after) the step of determining 1206 storage locations, or after (or as part of) the step of storing 1216 the manifest states. In one embodiment, the storage location of the node state of the executable node is at a first device and the storage location of the node state of the first node is at a second, different, device. For example, the first device could be an enterprise facility managed by a company offering a service involving the executable graph-based model within which the executable node is contained, and the second device could be a device of a user of the executable graph-based model. As such, the user is able to maintain their personal data separately from, and independently to, the enterprise facility managed by the company. Similarly, the node state of the overlay node may be stored at a storage location involving a third device which can be different to both the first and the second device. As such, the re-usable processing functionality of the executable graph-based model (i.e., the overlay structure) can be maintained and managed by a third party.

Figure 13:
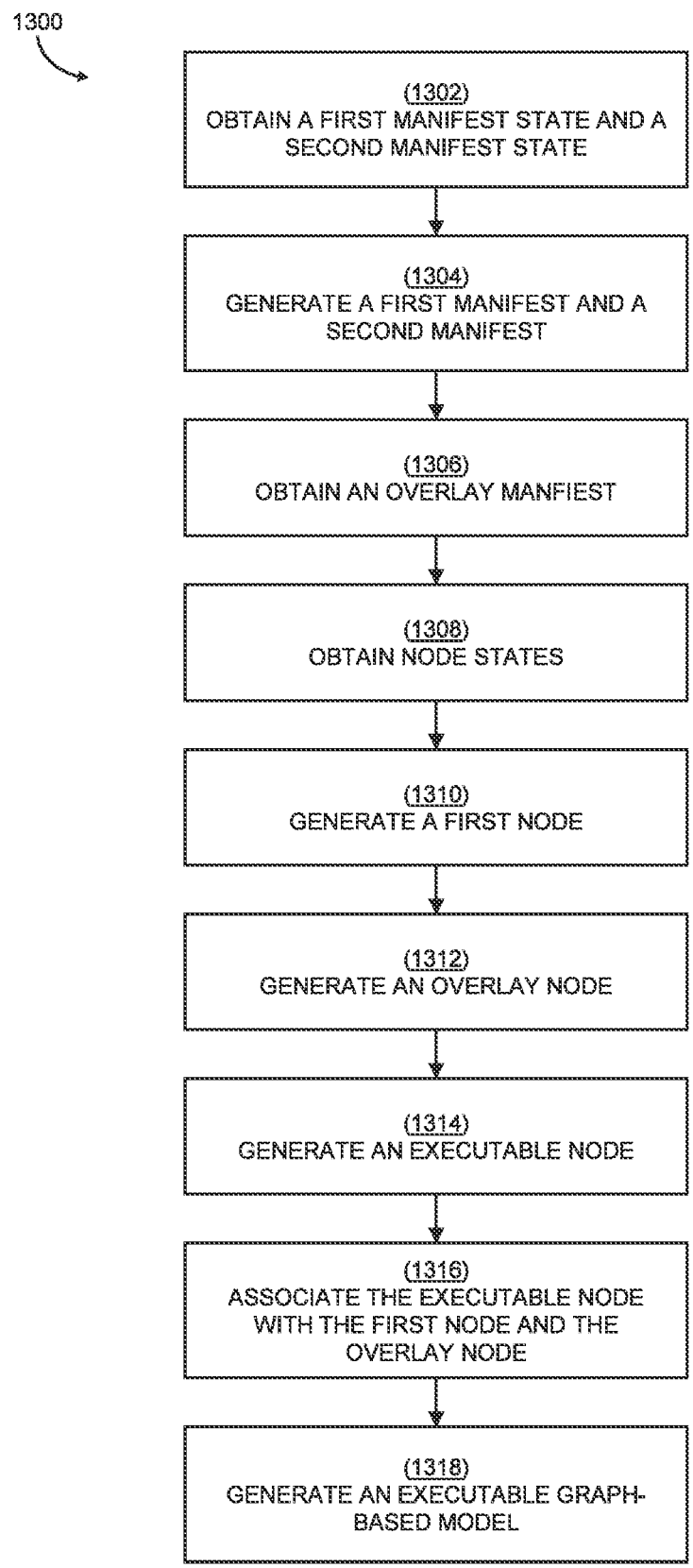
FIG. 13 shows a method for loading executable graph-based models, according to an embodiment of the present disclosure.

FIG. 13 shows a method 1300 for loading executable graph-based models, according to an embodiment of the present disclosure.

The method 1300 comprises the steps of obtaining 1302 a first manifest state and a second manifest state, generating 1304 a first manifest and a second manifest, obtaining 1306 an overlay manifest, obtaining 1308 node states, generating 1310 a first node, generating 1312 an overlay node, generating 1314 an executable node, associating 1316 the executable node with the first node and the overlay node, and generating 138 an executable graph-based model. In one embodiment, the method 1300 is performed by a system such as the system 300 described in more detail above in relation to FIG. 3.

At the step of obtaining 1302, a first manifest state and a second manifest state are obtained based on a first, shared, identifier. Both the first manifest state and the second manifest state comprise the first identifier. The first manifest state is associated with a first node and the second manifest state is associated with an executable node. The executable node comprises a composition of the first node and an overlay node.

At the step of generating 1304, a first manifest and a second manifest are generated from the first manifest state and the second manifest state respectively. The first manifest comprises the first identifier and a first node state storage location associated with the location at which a node state for the first node is stored (e.g., the manifest 486 and the identifier 494 shown in FIG. 4C). The second manifest comprises the first identifier, an overlay identifier, and a second node state storage location (e.g., the manifest 484, the identifier 490, and the overlay identifier 492 shown in FIG. 4C). The second node state storage location is associated with the location at which a node state for the executable node is stored. The overlay identifier is associated with an overlay manifest, or overlay manifest state, associated with the overlay node (e.g., the overlay identifier 492 of the manifest 484 shown in FIG. 4C is the same as the identifier 496 of the manifest 488 associated with the overlay node 470).

At the step of obtaining 1306, an overlay manifest is obtained based on the overlay identifier. The overlay manifest comprises the overlay identifier and overlay node state storage location (e.g., the manifest 488 and the identifier 496 shown in FIG. 4C). In one embodiment, the overlay manifest is obtained by first obtaining an overlay manifest state based on the overlay identifier and subsequently generating the overlay manifest based on the overlay manifest state.

At the step of obtaining 1308, a first node state is obtained from the first node state storage location (e.g., the state 476 shown in FIG. 4C), a second node state is obtained from the second node state storage location (e.g., the state 472 shown in FIG. 4C), and an overlay node state is obtained from the overlay node state storage location (e.g., the state 480 shown in FIG. 4C).

At the step of generating 1310, the first node is generated based on the first manifest and the first node state (e.g., the base node 468 shown in FIG. 4C is generated based on the manifest 486 and the state 476).

At the step of generating 1312, the overlay node is generated based on the overlay manifest and the overlay node state (e.g., the overlay node 470 shown in FIG. 4C is generated from the manifest 488 and the state 480), At the step of generating 1314, the executable node is generated based on the second manifest and the second node state (e.g., the executable node 466 is generated from the manifest 484 and the state 472).

At the step of associating 1316, the executable node is associated with the first node and the overlay node (e.g., the composition of the base node 468 and the overlay node 470 which forms the executable node 466 shown in FIG. 4C).

At the step of generating 1318, an executable graph-based model is generated, where the executable graph-based model comprises the executable node.

Figure 14:
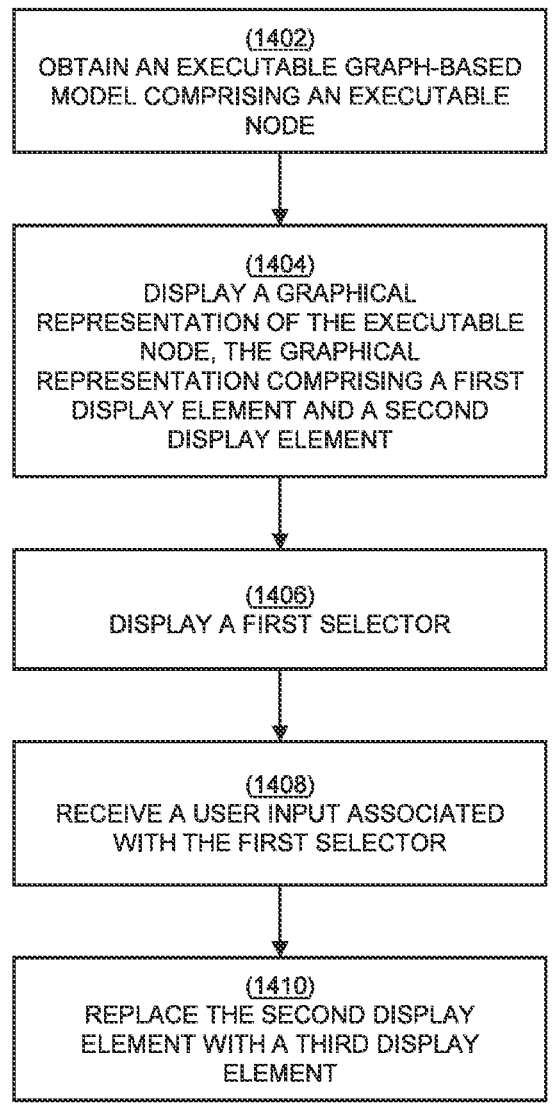
FIG. 14 shows a method for the interactive display of an overlay structure, according to an embodiment of the present disclosure.

FIG. 14 shows a method 1400 for the interactive display of an overlay structure, according to an embodiment of the present disclosure.

The method 1400 comprises the steps of obtaining 1402 an executable graph-based model, displaying 1404 a graphical representation comprising a first display element and a second display element, displaying 1406 a first selector, receiving 1408 a user input associated with the first selector, and replacing 1410 the second display element with a third display element. In one embodiment, the method 1400 is performed by a device comprising a display and a user input mechanism such as that described in relation to FIG. 15 below. In an alternative embodiment, the method 1400 is performed by a system such as the system 300 described above in relation to FIG. 3.

In general, the method 1400 corresponds to the functionality described in relation to FIGS. 9A-9G above which allows a user to explore the functionality of an executable graph-based model (i.e., the overlay structure) whilst maintaining display of the layout (topology) of the graph thus maintaining key contextual information.

At the step of obtaining 1402, an executable graph-based model is obtained. The executable graph-based model comprises an executable node which comprises a composition of a first node and a first overlay structure. The first overlay structure is associated with the first node.

At the step of displaying 1404, a graphical representation of the executable node of the executable graph-based model is displayed (e.g., the graphical representation 906 shown in FIGS. 9A-9D). The graphical representation comprises a first display element associated with the first node and a second display element associated with the first overlay structure (e.g., the first display element 908 and the second display element 910 shown in FIGS. 9A-9G).

The second display element represents the first overlay structure at a first level of detail. In the example shown in FIG. 9A, the second display element 910 represents the overlay structure at a simple level of detail because the overlay structure is represented by the circle encompassing the first display element 908 (which represents the first node of the executable node). In the example shown in FIG. 9C, the second display element represents the overlay structure at a more complex level of detail than that of FIG. 9A. In FIG. 9C the overlay structure is represented in the second display element by the plurality of visual indicators 928-932 which identify the three overlays within the first overlay structure of the executable node.

At the step of displaying 1406, a first selector associated with the graphical representation of the executable node is displayed.

As stated in detail above in relation to FIGS. 9A-9D, the first selector corresponds to any selectable object (e.g., button) which is operable to cause a change in the level of detail of the displayed executable graph-based model. For example, the first selector can be the first selector 916 or the first selector can be one of the plurality of visual indicators 928-932.

At the step of receiving 1408, a first user input associated with the first selector is received.

At the step of replacing 1410, the second display element of the graphical representation of the executable node is replaced with a third display element in response to the first user input being received (e.g., the second display element 910 shown in FIGS. 9A and 9B are replaced by a third display element comprising the plurality of visual indicators 928-932 as shown in FIG. 9C). The second display element is replaced with the third display element whilst maintaining display of the first display element. The third display element represents the first overlay structure at a second level of detail. The second level of detail is greater than the first level of detail. Alternatively, the second level of detail is less than the first level of detail.

Figure 15:
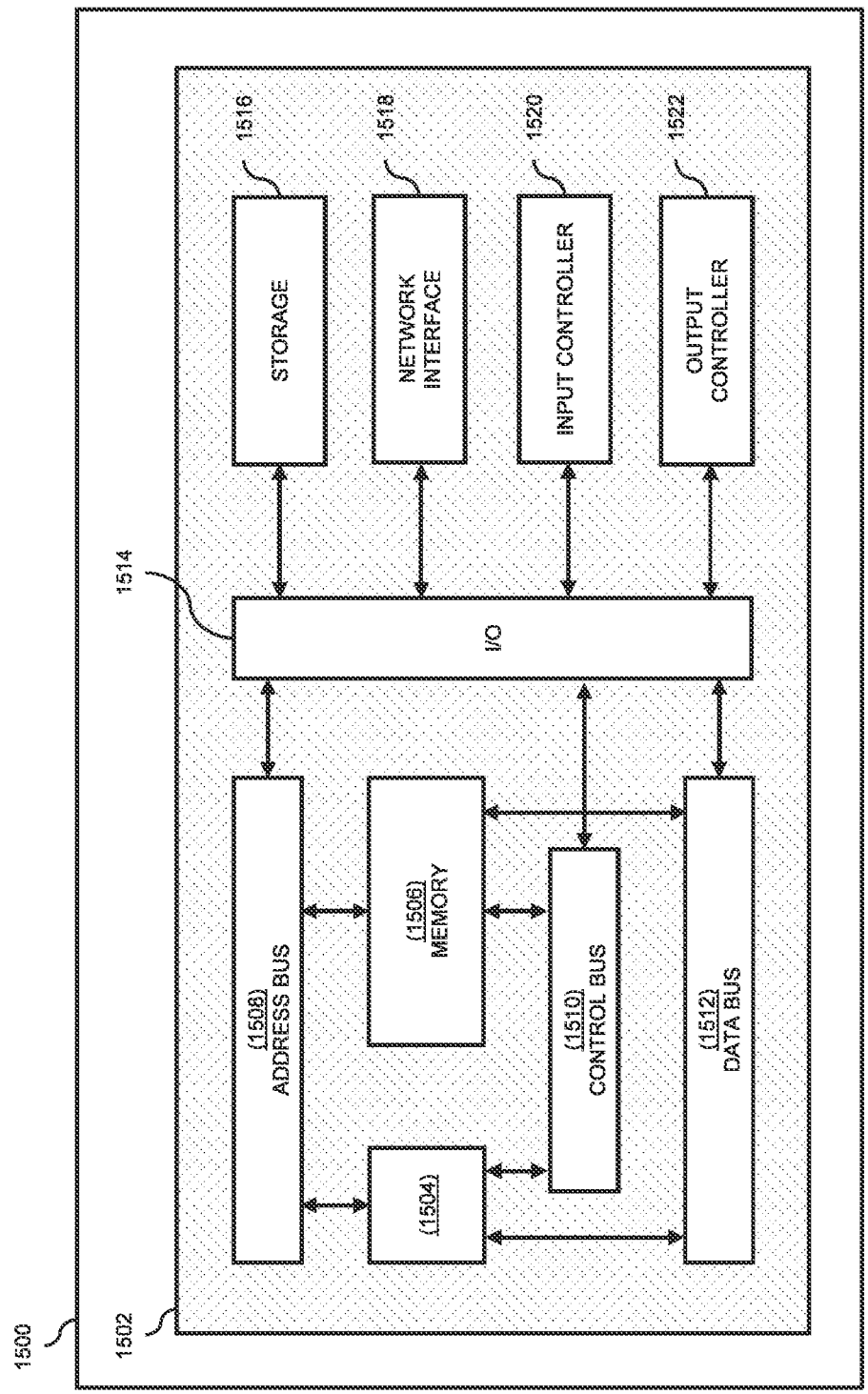
FIG. 15 shows an example computing system for carrying out the methods of the present disclosure.

FIG. 15 shows an example computing system for carrying out the methods of the present disclosure. Specifically, FIG. 15 shows a block diagram of an embodiment of a computing system according to example embodiments of the present disclosure.

Computing system 1500 can be configured to perform any of the operations disclosed herein such as, for example, any of the operations discussed with reference to the functional modules described in relation to FIG. 1A. The computing system 1500 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1500 is a distributed system configured to function using multiple computing machines interconnected via a data network or bus system.

The computing system 1500 includes one or more computing device(s) 1502. The one or more computing device(s) 1502 of computing system 1500 comprise one or more processors 1504 and memory 1506. One or more processors 1504 can be any general purpose processor(s) configured to execute a set of instructions. For example, one or more processors 1504 can be a processor core, a multiprocessor, a reconfigurable processor, a microcontroller, a digital signal processor ("DSP"), an application-specific integrated circuit ("ASIC"), a graphics processing unit ("GPU"), a neural processing unit ("NPU"), an accelerated processing unit ("APU"), a brain processing unit ("BPU"), a data processing unit ("DPU"), a holographic processing unit ("HPU"), an intelligent processing unit ("IPU"), a microprocessor/microcontroller unit ("MPU/MCU"), a radio processing unit ("RPU"), a tensor processing unit ("TPU"), a vector processing unit ("VPU"), a wearable processing unit ("WPU"), a field programmable gate array ("FPGA"), a programmable logic device ("PLD"), a controller, a state machine, gated logic, discrete hardware component, any other processing unit, or any combination or multiplicity thereof. In one embodiment, one or more processors 1504 include one processor. Alternatively, one or more processors 1504 include a plurality of processors that are operatively connected. For example, the one or more processors 1504 can be multiple processing units, a single processing core, multiple processing cores, special purpose processing cores, co-processors, or any combination thereof. One or more processors 1504 are communicatively coupled to memory 1506 via address bus 1508, control bus 1510, and data bus 1512.

Memory 1506 can include non-volatile memories such as read-only memory ("ROM"), programmable read-only memory ("PROM"), erasable programmable read-only memory ("EPROM"), flash memory, or any other device capable of storing program instructions or data with or without applied power. The memory 1506 can also include volatile memories, such as random-access memory ("RAM"), static random-access memory ("SRAM"), dynamic random-access memory ("DRAM"), and synchronous dynamic random-access memory ("SDRAM"). The memory 1506 can comprise single or multiple memory modules. While the memory 1506 is depicted as part of the one or more computing device(s) 1502, the skill person will recognize that the memory 1506 can be separate from the one or more computing device(s) 1502.

Memory 1506 can store information that can be accessed by one or more processors 1504. For instance, memory 1506 (e.g., one or more non-transitory computer-readable storage mediums, memory devices) can include computer-readable instructions (not shown) that can be executed by one or more processors 1504. The computer-readable instructions can be software written in any suitable programming language or can be implemented in hardware. Additionally, or alternatively, the computer-readable instructions can be executed in logically and/or virtually separate threads on one or more processors 1504. For example, memory 1506 can store instructions (not shown) that when executed by one or more processors 1504 cause one or more processors 1504 to perform operations such as any of the operations and functions for which computing system 1500 is configured, as described herein. In addition, or alternatively, memory 1506 can store data (not shown) that can be obtained, received, accessed, written, manipulated, created, and/or stored. The data can include, for instance, the data and/or information described herein in relation to FIGS. 1 to 14. In some implementations, the one or more computing device(s) 1502 can obtain from and/or store data in one or more memory device(s) that are remote from the computing system 1500.

The one or more computing device(s) 1502 further comprise I/O interface 1514 communicatively coupled to address bus 1508, control bus 1510, and data bus 1512. The I/O interface 1514 is configured to couple to one or more external devices (e.g., to receive and send data from/to one or more external devices). Such external devices, along with the various internal devices, may also be known as peripheral devices. The I/O interface 1514 may include both electrical and physical connections for operably coupling the various peripheral devices to the one or more computing device(s) 1502. The I/O interface 1514 may be configured to communicate data, addresses, and control signals between the peripheral devices and the one or more computing device(s) 1502. The I/O interface 1514 may be configured to implement any standard interface, such as a small computer system interface ("SCSI"), serial-attached SCSI ("SAS"), fiber channel, peripheral component interconnect ("PCI"), PCI express ("PCIe"), serial bus, parallel bus, advanced technology attachment ("ATA"), serialATA ("SATA"), universal serial bus ("USB"), Thunderbolt, FireWire, various video buses, and the like. The I/O interface 1514 is configured to implement only one interface or bus technology. Alternatively, the I/O interface 1514 is configured to implement multiple interfaces or bus technologies. The I/O interface 1514 may include one or more buffers for buffering transmissions between one or more external devices, internal devices, the one or more computing device(s), or the one or more processors 1504. The I/O interface 1514 may couple the one or more computing device(s) 1502 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1514 may couple the one or more computing device(s) 1502 to various output devices, including video displays, speakers, printers, projectors, tactile feedback devices, automation control, robotic components, actuators, motors, fans, solenoids, valves, pumps, transmitters, signal emitters, lights, and so forth.

Computing system 1500 further comprises storage unit 1516, network interface 1518, input controller 1520, and output controller 1522. Storage unit 1516, network interface 1518, input controller 1520, and output controller 1522 are communicatively coupled to the central control unit (i.e., the memory 1506, the address bus 1508, the control bus 1510, and the data bus 1512) via I/O interface 1514. The network interface 1518 communicatively couples the computing system 1500 to one or more networks such as wide area networks ("WAN"), local area networks ("LAN"), intranets, the Internet, wireless access networks, wired networks, mobile networks, telephone networks, optical networks, or combinations thereof. The network interface 1518 may facilitate communication with packet switched networks or circuit switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

Storage unit 1516 is a computer readable medium, preferably a non-transitory computer readable medium, comprising one or more programs, the one or more programs comprising instructions which when executed by the one or more processors 1504 cause computing system 1500 to perform the method steps of the present disclosure. Alternatively, storage unit 1516 is a transitory computer readable medium. Storage unit 1516 can include a hard disk, a floppy disk, a compact disc read-only memory ("CD-ROM"), a digital versatile disc ("DVD"), a Blu-ray disc, a magnetic tape, a flash memory, another non-volatile memory device, a solid-state drive ("SSD"), any magnetic storage device, any optical storage device, any electrical storage device, any semiconductor storage device, any physical-based storage device, any other data storage device, or any combination or multiplicity thereof. In one embodiment, the storage unit 1516 stores one or more operating systems, application programs, program modules, data, or any other information. The storage unit 1516 is part of the one or more computing device(s) 1502. Alternatively, the storage unit 1516 is part of one or more other computing machines that are in communication with the one or more computing device(s) 1502, such as servers, database servers, cloud storage, network attached storage, and so forth.

Moreover, for example, the present technology/system may achieve the following configurations:

1. A system for dynamic generation of executable graph-based models, the system comprising processing circuitry and a memory unit operatively coupled to the processing circuitry and having instructions stored thereon that, when executed by the processing circuitry, cause the processing circuitry to:
   obtain a graph-based model comprising one or more nodes;
   obtain a first overlay node comprising processing logic operable to interact with at least one node of an associated graph-based model;
   determine an association between a first node of the graph-based model and the first overlay node; and
   generate an executable graph-based model, wherein the executable graph-based model includes a first executable node comprising a composition of the first node of the graph-based model and the first overlay node based on the association between the first node of the graph-based model and the first overlay node.

2. The system of 1, wherein the instructions, when executed by the processing circuitry, further cause the processing circuitry to:
   receive a first stimulus associated with the first overlay node; and
   in response to the first stimulus being received, cause execution of said processing logic of the first executable node.

3. The system of 2, wherein the first stimulus comprises a first context such that execution of said processing logic of the first executable node is based on the first context.

4. The system of 2, wherein the first node comprises a state.

5. The system of 4, wherein the state is shared by the first node and a second node of the graph-based model.

6. The system of 4, wherein execution of said processing logic of the first executable node causes a change in the state of the first node.

7. The system of 6, wherein the state of the first node comprises a first attribute.

8. The system of 7, wherein execution of said processing logic of the first executable node causes a value of the first attribute to be set.

9. The system of 7, wherein execution of said processing logic of the first executable node causes a value of the first attribute to be output.

10. The system of 7, wherein execution of said processing logic of the first executable node cause a second attribute to be generated for the state of the first node.

11. The system of 10, wherein execution of said processing logic of the first executable node causes a value for the second attribute to be set.

12. The system of 2, wherein execution of said processing logic of the first executable node causes a second stimulus associated with a second overlay node to be fired.

13. The system of 12, wherein the instructions, when executed by the processing circuitry, further cause the processing circuitry to:
   receive the second stimulus associated with the second overlay node; and
   in response to the second stimulus being received, cause execution of processing logic associated with the second overlay node.

14. The system of 2, wherein the instructions, when executed by the processing circuitry, further cause the processing circuitry to:
   in response to the first stimulus being received, cause execution of processing logic of a second executable node in the executable graph-based model, wherein the second executable node comprises a composition of a second node of the graph-based model and the first overlay node.

15. The system of 1, wherein the first node is derived from a second node.

16. The system of 15, wherein the first node is derived from the second node and a third node.

17. The system of 1 wherein the first node comprises a unique identifier, one or more attributes each having corresponding attribute values, a version, a name, a namespace, and associated metadata.

18. The system of 1, wherein the association between the first node of the graph-based model and the first overlay node is determined based on a predetermined configuration.

19. The system of 1, wherein each node is associated with a node type.

20. The system of 19, wherein the node type of the first node is a data node type.

21. The system of 19, wherein the node type of the first node is a value node type.

22. The system of 19, wherein the first overlay node is a node associated with an overlay node type.

23. The system of 19 wherein the first overlay node defines the node type of the first node.

24. The system of 19, wherein the first node comprises a composition of a second node of the graph-based model and a second overlay node.

25. The system of 24, wherein execution of the first executable node causes execution of said processing logic of the first overlay node and said processing logic of the second overlay node.

26. The system of 25, wherein execution of said processing logic of the second overlay node is dependent upon execution of said processing logic of the first overlay node.

27. The system of 25, wherein execution of said processing logic of the first overlay node is dependent upon execution of said processing logic of the second overlay node.

28. The system of 19, wherein the node type of the first node is an edge node type such that the first node is a first edge node.

29. The system of 28, wherein the first edge node connects a plurality of nodes within the executable graph-based model.

30. The system of 29, wherein the plurality of nodes within the executable graph-based model are connected by the first edge node via a corresponding plurality of roles, wherein each role in the corresponding plurality of roles corresponds to anode associated with a role node type.

31. The system of 30, wherein each role in the corresponding plurality of roles defines a relationship between the first edge node and a respective node of the plurality of nodes connected by the first edge node.

32. The system of 1, wherein the graph-based model is executable.

33. The system of 1, wherein the graph-based model is a graph-based data model.

34. A method for dynamic generation of executable graph-based models, the method comprising:
   obtaining, by processing circuitry, a graph-based model comprising one or more nodes;

obtaining, by the processing circuitry, a first overlay node comprising processing logic operable to interact with at least one node of an associated graph-based model;

determining, by the processing circuitry, an association between a first node of the graph-based model and the first overlay node; and generating, by the processing circuitry, an executable graph-based model, wherein the executable graph-based model includes a first executable node comprising a composition of the first node of the graph-based model and the first overlay node based on the association between the first node of the graph-based model and the first overlay node.

35. A non-transitory computer-readable medium storing instructions which, when executed by processing circuitry, cause the processing circuitry to:

obtain a graph-based model comprising one or more nodes;

obtain a first overlay node comprising processing logic operable to interact with at least one node of an associated graph-based model;

determine an association between a first node of the graph-based model and the first overlay node; and generate an executable graph-based model, wherein the executable graph-based model includes a first executable node comprising a composition of the first node of the graph-based model and the first overlay node based on the association between the first node of the graph-based model and the first overlay node.

36. A method for storage management of executable graph-based models, the method comprising:

obtaining, by processing circuitry, an executable node comprising a composition of a first node and a first overlay node;

extracting, by the processing circuitry, a node state from each of the executable node, the first node, and the first overlay node, wherein the node state of the executable node and the node state of the first node both comprise a shared identifier;

determining, by the processing circuitry, a storage location for the node state of each of the executable node, the first node, and the first overlay node;

generating, by the processing circuitry, an overlay node manifest associated with the first overlay node, wherein the overlay node manifest comprises an overlay identifier and the storage location for the node state of the first overlay node;

generating, by the processing circuitry, a first node manifest associated with the executable node, wherein the first node manifest comprises the shared identifier, the overlay identifier, and the storage location for the node state of the executable node;

generating, by the processing circuitry, a second node manifest associated with the first node, wherein the second node manifest comprises the shared identifier and the storage location for the node state of the first node;

generating, by the processing circuitry, a manifest state for each of the overlay node manifest, first node manifest, and the second node manifest, wherein the manifest state of each of the first node manifest and the second node manifest comprises the shared identifier; and storing, by the processing circuitry, the manifest state for each of the overlay node manifest, first node manifest, and the second node manifest.

37. The method of 36 further comprising:

storing, by the processing circuitry, the node state of each of the executable node and the first node at their respective storage locations.

38. The method of 37 wherein the storage location of the node state of the executable node is at a first device.

39. The method of 37 wherein the storage location of the node state of the first node is at a second device.

40. The method of 36 further comprising:

storing, by the processing circuitry, the node state of the overlay node at the respective storage location.

41. The method of 40 wherein the storage location of the node state of the overlay node is at a third device.

42. The method of 36 wherein the first node state of the first node comprises a first verification code.

43. The method of 42 wherein the manifest state associated with the first node comprises the first verification code.

44. The method of 36 wherein the first node is associated with a node type.

45. The method of 44 wherein the node type of the first node is one of: a data node type, a value node type, an edge node type, or a role node type.

46. A device comprising processing circuitry and a memory storing instructions which, when executed by the processing circuitry, cause the processing circuitry to:

obtain an executable node comprising a composition of a first node and a first overlay node;

extract a node state from each of the executable node, the first node, and the first overlay node, wherein the node state of the executable node and the node state of the first node both comprise a shared identifier;

determine a storage location for the node state of each of the executable node, the first node, and the first overlay node;

generate an overlay node manifest associated with the first overlay node, wherein the overlay node manifest comprises an overlay identifier and the storage location for the node state of the first overlay node;

generate a first node manifest associated with the executable node, wherein the first node manifest comprises the shared identifier, the overlay identifier, and the storage location for the node state of the executable node;

generate a second node manifest associated with the first node, wherein the second node manifest comprises the shared identifier and the storage location for the node state of the first node;

generate a manifest state for each of the overlay node manifest, first node manifest, and the second node manifest, wherein the manifest state of each of the first node manifest and the second node manifest comprises the shared identifier; and store the manifest state for each of the overlay node manifest, first node manifest, and the second node manifest.

47. A non-transitory computer-readable medium storing instructions which, when executed by processing circuitry, cause the processing circuitry to:

obtain an executable node comprising a composition of a first node and a first overlay node;

extract a node state from each of the executable node, the first node, and the first overlay node, wherein the node state of the executable node and the node state of the first node both comprise a shared identifier;

determine a storage location for the node state of each of the executable node, the first node, and the first overlay node;

generate an overlay node manifest associated with the first overlay node, wherein the overlay node manifest comprises an overlay identifier and the storage location for the node state of the first overlay node;

generate a first node manifest associated with the executable node, wherein the first node manifest comprises the shared identifier, the overlay identifier, and the storage location for the node state of the executable node;

generate a second node manifest associated with the first node, wherein the second node manifest comprises the shared identifier and the storage location for the node state of the first node;

generate a manifest state for each of the overlay node manifest, first node manifest, and the second node manifest, wherein the manifest state of each of the first node manifest and the second node manifest comprises the shared identifier; and store the manifest state for each of the overlay node manifest, first node manifest, and the second node manifest.

48. A method for loading executable graph-based models, the method comprising:

obtaining, by processing circuitry and based on a first identifier, a first manifest state and a second manifest state, wherein the first manifest state and the second manifest state both comprise the first identifier;

generating, by the processing circuitry, a first manifest and a second manifest from the first manifest state and the second manifest state respectively, wherein the first manifest comprises a first node state storage location, and the second manifest comprises a second node state storage location and an overlay identifier;

obtaining, by the processing circuitry, an overlay manifest based on the overlay identifier, wherein the overlay manifest comprises the overlay identifier and an overlay node state storage location;

obtaining, by the processing circuitry, a first node state from the first node state storage location, a second node state from the second node state storage location, and an overlay node state from the overlay node state storage location;

generating, by the processing circuitry, a first node based on the first manifest and the first node state;

generating, by the processing circuitry, an overlay node based on the overlay manifest and the overlay node state;

generating, by the processing circuitry, an executable node based on the second manifest and the second node state;

associating, by the processing circuitry, the executable node with the first node and the overlay node; and generating, by the processing circuitry, an executable graph-based model comprising the executable node.

49. A device comprising processing circuitry and a memory storing instructions which, when executed by the processing circuitry, cause the processing circuitry to:

obtain, based on a first identifier, a first manifest state and a second manifest state, wherein the first manifest state and the second manifest state both comprise the first identifier;

generate a first manifest and a second manifest from the first manifest state and the second manifest state respectively, wherein the first manifest comprises a first node state storage location, and the second manifest comprises a second node state storage location and an overlay identifier;

obtain an overlay manifest based on the overlay identifier, wherein the overlay manifest comprises the overlay identifier and an overlay node state storage location;

obtain a first node state from the first node state storage location, a second node state from the second node state storage location, and an overlay node state from the overlay node state storage location;

generate a first node based on the first manifest and the first node state;

generate an overlay node based on the overlay manifest and the overlay node state;

generate an executable node based on the second manifest and the second node state;

associate the executable node with the first node and the overlay node; and generate an executable graph-based model comprising the executable node.

50. A non-transitory computer-readable medium storing instructions which, when executed by processing circuitry, cause the processing circuitry to:

obtain, based on a first identifier, a first manifest state and a second manifest state, wherein the first manifest state and the second manifest state both comprise the first identifier;

generate a first manifest and a second manifest from the first manifest state and the second manifest state respectively, wherein the first manifest comprises a first node state storage location, and the second manifest comprises a second node state storage location and an overlay identifier;

obtain an overlay manifest based on the overlay identifier, wherein the overlay manifest comprises the overlay identifier and an overlay node state storage location;

obtain a first node state from the first node state storage location, a second node state from the second node state storage location, and an overlay node state from the overlay node state storage location;

generate a first node based on the first manifest and the first node state;

generate an overlay node based on the overlay manifest and the overlay node state;

generate an executable node based on the second manifest and the second node state;

associate the executable node with the first node and the overlay node; and generate an executable graph-based model comprising the executable node.

51. A device comprising:

a display;

an interface unit configured to receive one or more user inputs; and processing circuitry operatively coupled to the display and the interface unit, wherein the processing circuitry is configured to:

obtain an executable graph-based model comprising an executable node, wherein the executable node comprises a composition of a first node and a first overlay structure associated with the first node;

display, on the display of the device, a graphical representation of the executable node of the executable graph-based model, the graphical representation comprising a first display element associated with the first node and a second display element associated with the first overlay structure, wherein the second display element represents the first overlay structure at a first level of detail;

display, on the display device, a first selector associated with the graphical representation of the executable node;

receive, from the interface unit, a first user input associated with the first selector; and in response to the first user input being received, replace the second display element of the graphical representation of the executable node with a third display element whilst maintaining display of the first display element, wherein the third display element represents the first overlay structure at a second level of detail.

52. The device of 51 wherein the second level of detail is greater than the first level of detail.

53. The device of 52 wherein the second display element comprises a first shape encompassing the first display element.

54. The device of 53 wherein the third display element comprises the first shape and one or more visual indicators associated with one or more overlays within the first overlay structure.

55. The device of 54 wherein the one or more visual indicators are displayed along an edge of the first shape.

56. The device of 54 wherein the one or more visual indicators comprise one or more shapes.

57. The device of 54 wherein the one or more visual indicators comprise one or more icons.

58. The device of 52 wherein the second display element comprises one or more visual indicators associated with one or more overlays within the first overlay structure.

59. The device of 58 wherein the one or more visual indicators are displayed along an edge of a first shape encompassing the first display element.

60. The device of 58 wherein the one or more visual indicators comprise one or more shapes.

61. The device of 58 wherein the one or more visual indicators comprise one or more icons.

62. The device of 58 wherein the first selector is a first visual indicator of the one or more visual indicators, the first visual indicator associated with a first overlay of the one or more overlays within the first overlay structure.

63. The device of 62 wherein the third display element comprises a structural representation of the first overlay.

64. The device of 63 wherein the one or more visual indicators comprise a second visual indicator associated with a second overlay of the one or more overlays within the first overlay structure.

65. The device of 64 wherein the third display element comprises the structural representation of the first overlay and the second visual indicator associated with the second overlay.

66. The device of 51 wherein the second level of detail is less than the first level of detail.

67. The device of 51 wherein the processing circuitry is further configured to:

display, on the display of the device, a layout of the executable graph-based model such that the graphical representation is displayed as part of the layout.

68. The device of 67 wherein the layout comprises one or more further graphical representations of one or more further elements of the executable graph-based model.

69. The device of 68 wherein the second display element is replaced by the third display element, in response to the first user input being received, whilst maintaining display of the one or more further graphical representations within the layout.

70. The device of 68 wherein the one or more further elements of the executable graph-based model include one or more of: a node, an edge, a role, and an overlay.

71. The device of 51 wherein the first selector is displayed proximate the graphical representation of the first node.

72. The device of 51 wherein the first selector and the graphical representation are contiguous.

73. The device of 51 wherein the first display element associated with the first node comprises a shape.

74. The device of 73 wherein the shape is a circle.

75. The device of 51 wherein the first display element associated with the first node comprises an icon indicative of the first node.

76. The device of 51 wherein the first display element associated with the first node comprises a label.

77. A method for interactive visualization of executable graph-based models, the method comprising:

obtaining, by processing circuitry, an executable graph-based model comprising an executable node, wherein the executable node comprises a composition of a first node and a first overlay structure associated with the first node;

displaying, by the processing circuitry, a graphical representation of the executable node of the executable graph-based model, the graphical representation comprising a first display element associated with the first node and a second display element associated with the first overlay structure, wherein the second display element represents the first overlay structure at a first level of detail;

displaying, by the processing circuitry, a first selector associated with the graphical representation of the executable node;

receiving, by the processing circuitry, a first user input associated with the first selector; and in response to the first user input being received, replacing, by the processing circuitry, the second display element of the graphical representation of the executable node with a third display element whilst maintaining display of the first display element, wherein the third display element represents the first overlay structure at a second level of detail.

78. A non-transitory computer-readable medium storing instructions which, when executed by one or more processors, cause the one or more processors to:

obtain an executable graph-based model comprising an executable node, wherein the executable node comprises a composition of a first node and a first overlay structure associated with the first node;

display a graphical representation of the executable node of the executable graph-based model, the graphical representation comprising a first display element associated with the first node and a second display element associated with the first overlay structure, wherein the second display element represents the first overlay structure at a first level of detail;

display a first selector associated with the graphical representation of the executable node;

receive a first user input associated with the first selector; and in response to the first user input being received, replace the second display element of the graphical representation of the executable node with a third display element whilst maintaining display of the first display element, wherein the third display element represents the first overlay structure at a second level of detail.

79. A system comprising:
an executable graph-based model, the executable graph-based model comprising:
a first overlay node, wherein the first overlay node comprises processing logic operable to interact with one or more associated nodes of the executable graph-based model; and
a first node having the first overlay node associated therewith; and
a processing unit configured to:
receive a first stimulus associated with the first overlay node; and
in response to the first stimulus being received, cause execution of said processing logic of the first overlay node, wherein execution of said processing logic of the first overlay node is based on the first node.

80. The system of 79 wherein the first stimulus comprises a first context such that execution of said processing logic of the first overlay node is based on the first context.

81. The system of 80 wherein the first node comprises a state.

82. The system of 81 wherein the state is shared by the first node and a second node of the graph-based model.

83. The system of 81 wherein execution of said processing logic of the first overlay node causes a change in the state of the first node.

84. The system of 83 wherein the state of the first node comprises a first attribute.

85. The system of 84 wherein execution of said processing logic of the first overlay node causes a value of the first attribute to be set.

86. The system of 84 wherein execution of said processing logic of the first overlay node causes a value of the first attribute to be output.

87. The system of 84 wherein execution of said processing logic of the first overlay node cause a second attribute to be generated for the state of the first node.

88. The system of 87 wherein execution of said processing logic of the first overlay node causes a value for the second attribute to be set.

89. The system of 80 wherein execution of said processing logic of the first overlay node causes a second stimulus associated with a second overlay node of the executable graph-based model to be fired.

90. The system of 89 wherein the processing unit is further configured to:
receive the second stimulus associated with the second overlay node; and
in response to the second stimulus being received, cause execution of processing logic associated with the second overlay node.

91. The system of 79 wherein the first node is derived from a second node.

92. The system of 91 wherein the first node is derived from the second node and a third node.

93. The system of 79 wherein the first node comprises a unique identifier, one or more attributes each having corresponding attribute values, a version, a name, a namespace, and associated metadata.

94. The system of 79 wherein each node within the executable graph-based model is associated with a node type.

95. The system of 94 wherein the node type of the first node is a data node type.

96. The system of 94 wherein the node type of the first node is a value node type.

97. The system of 94 wherein the first overlay node is a node associated with an overlay node type.

98. The system of 94 wherein the first overlay node defines the node type of the first node.

99. The system of 94 wherein the first node comprises a composition of a second node of the graph-based model and a second overlay node.

100. The system of 99 wherein execution of said processing logic of the first overlay node causes execution of processing logic of the second overlay node.

101. The system of 94 wherein the node type of the first node is an edge node type such that the first node is a first edge node.

102. The system of 101 wherein the first edge node connects a plurality of nodes within the executable graph-based model.

103. The system of 102 wherein the plurality of nodes within the executable graph-based model are connected by the first edge node via a corresponding plurality of roles, wherein each role in the corresponding plurality of roles corresponds to anode associated with a role node type.

104. The system of 103 wherein each role in the corresponding plurality of roles defines a relationship between the first edge node and a respective node of the plurality of nodes connected by the first edge node.

105. A method comprising:
obtaining, by one or more processors, an executable graph-based model, the executable graph-based model comprising:
a first overlay node, wherein the first overlay node comprises processing logic operable to interact with one or more associated nodes of the executable graph-based model; and
a first node having the first overlay node associated therewith;
receiving, by the one or more processors, a first stimulus associated with the first overlay node; and
in response to the first stimulus being received, causing, by the one or more processors, execution of said processing logic of the first overlay node, wherein execution of said processing logic of the first overlay node is based on the first node.

106. A non-transitory computer-readable medium storing instructions which, when executed by processing circuitry, cause the processing circuitry to:
obtain an executable graph-based model, the executable graph-based model comprising:
a first overlay node, wherein the first overlay node comprises processing logic operable to interact with one or more associated nodes of the executable graph-based model; and
a first node having the first overlay node associated therewith;
receive a first stimulus associated with the first overlay node; and
in response to the first stimulus being received, cause execution of said processing logic of the first overlay node, wherein execution of said processing logic of the first overlay node is based on the first node.

I claim:

1. A method for storage management of executable graph-based models, the method comprising:
obtaining, by processing circuitry, an executable node comprising a composition of a first node and a first overlay node; and
decomposing, by the processing circuitry, the executable node into separate elements for persistent storage in a physical storage medium, wherein the decomposition of the executable node comprises:
- extracting, by the processing circuitry, a node state from each of the executable node, the first node, and the first overlay node, wherein the node state of the executable node and the node state of the first node both comprise a shared identifier;
- determining, by the processing circuitry, a storage location in a respective physical storage medium for the node state of each of the executable node, the first node, and the first overlay node;
- generating, by the processing circuitry, an overlay node manifest associated with the first overlay node, wherein the overlay node manifest comprises an overlay identifier and the storage location for the node state of the first overlay node;
- generating, by the processing circuitry, a first node manifest associated with the executable node, wherein the first node manifest comprises the shared identifier, the overlay identifier, and the storage location for the node state of the executable node;
- generating, by the processing circuitry, a second node manifest associated with the first node, wherein the second node manifest comprises the shared identifier and the storage location for the node state of the first node;
- generating, by the processing circuitry, a manifest state for each of the overlay node manifest, first node manifest, and the second node manifest, wherein the manifest state of each of the first node manifest and the second node manifest comprises the shared identifier; and
- storing, by the processing circuitry, the manifest state for each of the overlay node manifest, first node manifest, and the second node manifest.

2. The method of claim 1, further comprising:
storing, by the processing circuitry, the node state of each of the executable node and the first node at a respective storage location.

3. The method of claim 2, wherein the storage location of the node state of the executable node is at a first device.

4. The method of claim 2, wherein the storage location of the node state of the first node is at a second device.

5. The method of claim 1, further comprising:
storing, by the processing circuitry, the node state of the first overlay node at a respective storage location.

6. The method of claim 5, wherein the storage location of the node state of the first overlay node is at a third device.

7. The method of claim 1, wherein the node state of the first node comprises a first verification code.

8. The method of claim 7, wherein the manifest state associated with the first node comprises the first verification code.

9. The method of claim 1, wherein the first node is associated with a node type.

10. The method of claim 9, wherein the node type of the first node is one of: a data node type, a value node type, an edge node type, or a role node type.

11. A non-transitory computer-readable medium storing instructions which, based on execution by processing circuitry, cause the processing circuitry to:
- obtain an executable node comprising a composition of a first node and a first overlay node; and
- decompose the executable node into separate elements for persistent storage in a physical storage medium, wherein for the decomposition of the executable node the instructions based on the execution by the processing circuitry, further cause the processing circuitry to:
  - extract a node state from each of the executable node, the first node, and the first overlay node, wherein the node state of the executable node and the node state of the first node both comprise a shared identifier;
  - determine a storage location for the node state of each of the executable node, the first node, and the first overlay node;
  - generate an overlay node manifest associated with the first overlay node, wherein the overlay node manifest comprises an overlay identifier and the storage location for the node state of the first overlay node;
  - generate a first node manifest associated with the executable node, wherein the first node manifest comprises the shared identifier, the overlay identifier, and the storage location for the node state of the executable node;
  - generate a second node manifest associated with the first node, wherein the second node manifest comprises the shared identifier and the storage location for the node state of the first node;
  - generate a manifest state for each of the overlay node manifest, first node manifest, and the second node manifest, wherein the manifest state of each of the first node manifest and the second node manifest comprises the shared identifier; and
  - store the manifest state for each of the overlay node manifest, first node manifest, and the second node manifest.

12. The non-transitory computer-readable medium of claim 11, wherein the instructions which, based on the execution by the processing circuitry, further cause the processing circuitry to:
store the node state of each of the executable node and the first node at a respective storage location.

13. The non-transitory computer-readable medium of claim 12, wherein the storage location of the node state of the executable node is at a first device.

14. The non-transitory computer-readable medium of claim 13, wherein the storage location of the node state of the first node is at a second device.

15. The non-transitory computer-readable medium of claim 11, wherein the instructions which, based on the execution by the processing circuitry, further cause the processing circuitry to:
store the node state of the first overlay node at a respective storage location.

16. The non-transitory computer-readable medium of claim 15, wherein the storage location of the node state of the first overlay node is at a third device.

17. The non-transitory computer-readable medium of claim 11, wherein the node state of the first node comprises a first verification code.

18. The non-transitory computer-readable medium of claim 17, wherein the manifest state associated with the first node comprises the first verification code.

19. A method for loading executable graph-based models, the method comprising:
- obtaining, by processing circuitry and based on a first identifier, a first manifest state and a second manifest state, wherein the first manifest state and the second manifest state both comprise the first identifier;
- generating, by the processing circuitry, a first manifest and a second manifest from the first manifest state and the second manifest state respectively, wherein the first manifest comprises a first node state storage location, and the second manifest comprises a second node state storage location and an overlay identifier;

obtaining, by the processing circuitry, an overlay manifest based on the overlay identifier, wherein the overlay manifest comprises the overlay identifier and an overlay node state storage location, wherein each of the first node state storage location, the second node state storage location, and the overlay node state storage location corresponds to a respective physical storage medium, and wherein a first node state, a second node state, and an overlay node state are persistently stored at the first node state storage location, the second node state storage location, and the overlay node state storage location, respectively, at the respective physical storage medium;

obtaining, by the processing circuitry, the first node state from the first node state storage location, the second node state from the second node state storage location, and the overlay node state from the overlay node state storage location;

generating, by the processing circuitry, a first node based on the first manifest and the first node state;

generating, by the processing circuitry, an overlay node based on the overlay manifest and the overlay node state;

generating, by the processing circuitry, an executable node based on the second manifest and the second node state;

associating, by the processing circuitry, the executable node with the first node and the overlay node; and generating, by the processing circuitry, an executable graph-based model comprising the executable node.

20. A device comprising processing circuitry and a memory storing instructions which, based on execution by the processing circuitry, cause the processing circuitry to:

obtain, based on a first identifier, a first manifest state and a second manifest state, wherein the first manifest state and the second manifest state both comprise the first identifier;

generate a first manifest and a second manifest from the first manifest state and the second manifest state respectively, wherein the first manifest comprises a first node state storage location, and the second manifest comprises a second node state storage location and an overlay identifier;

obtain an overlay manifest based on the overlay identifier, wherein the overlay manifest comprises the overlay identifier and an overlay node state storage location, wherein each of the first node state storage location, the second node state storage location, and the overlay node state storage location corresponds to a respective physical storage medium, and wherein a first node state, a second node state, and an overlay node state are persistently stored at the first node state storage location, the second node state storage location, and the overlay node state storage location, respectively, at the respective physical storage medium;

obtain the first node state from the first node state storage location, the second node state from the second node state storage location, and the overlay node state from the overlay node state storage location;

generate a first node based on the first manifest and the first node state;

generate an overlay node based on the overlay manifest and the overlay node state;

generate an executable node based on the second manifest and the second node state;

associate the executable node with the first node and the overlay node; and generate an executable graph-based model comprising the executable node.

* * * * *